(12) United States Patent
Baert

(10) Patent No.: US 12,721,270 B2
(45) Date of Patent: Sep. 1, 2026

(54) PROCESSING MACHINE FOR FIBRE PLANTS

(71) Applicant: HYLER BV, Sint-Baafs-Vijve (BE)

(72) Inventor: Niels Baert, Sint-Baafs-Vijve (BE)

(73) Assignee: HYLER BV, Sint-Baafs-Vijve (BE)

( * ) Notice: Subject to any disclaimer, the term of this patent is extended or adjusted under 35 U.S.C. 154(b) by 462 days.

(21) Appl. No.: 18/259,194

(22) PCT Filed: Dec. 24, 2021

(86) PCT No.: PCT/EP2021/087644

§ 371 (c)(1),
(2) Date: Jun. 23, 2023

(87) PCT Pub. No.: WO2022/136702

PCT Pub. Date: Jun. 30, 2022

(65) Prior Publication Data

US 2024/0049640 A1 Feb. 15, 2024

(30) Foreign Application Priority Data

Dec. 24, 2020 (BE) .................................. 2020/5983

(51) Int. Cl.
*A01D 45/06* (2006.01)

(52) U.S. Cl.
CPC ........... *A01D 45/06* (2013.01); *A01D 45/065* (2013.01)

(58) Field of Classification Search
CPC .............................. A01D 45/06; A01D 45/065
See application file for complete search history.

(56) References Cited

U.S. PATENT DOCUMENTS 8,220,236 B1 * 7/2012 Benner ................ A01D 45/003 56/63
2016/0183462 A1 * 6/2016 Magisson ............. A01D 41/14 56/192

(Continued)

FOREIGN PATENT DOCUMENTS

AT 389028 B 10/1989
CN 1754418 A * 4/2006 ........... A01D 45/065

(Continued)

OTHER PUBLICATIONS

AT_389028_B_-_English_translation (Year: 1989).*

(Continued)

*Primary Examiner* — Joseph M Rocca
*Assistant Examiner* — Julia C Tran
(74) *Attorney, Agent, or Firm* — NIXON & VANDERHYE

(57) ABSTRACT

A processing machine for processing relatively short fiber plants such as flax and relatively long fiber plants such as hemp includes a self-propelling vehicle including a vehicle chassis provided with a first conveyor for transporting at least parts of the fiber plants from a first end to an opposite second end, and a second conveyor for transporting at least parts of the fiber plants from the first end to the second end, first and second delivering units provided at or close to the second end for the purpose of delivering and placing on the ground surface the fiber plants coming from respectively the first and second conveyor. The vehicle chassis includes a first mounting system for mounting of, as desired, either a first exchangeable picking unit or a second exchangeable picking unit.

21 Claims, 16 Drawing Sheets

(56) References Cited

U.S. PATENT DOCUMENTS

| | | | | |
|---|---|---|---|---|
| 2018/0014462 | A1* | 1/2018 | Borry | A01D 41/142 |
| 2020/0253120 | A1 | 8/2020 | Hefner | |
| 2022/0240447 | A1* | 8/2022 | Van Puyvelde | A01D 57/20 |

FOREIGN PATENT DOCUMENTS

| | | | |
|---|---|---|---|
| CN | 201438816 | U | 4/2010 |
| EP | 3272202 | A1 | 1/2018 |
| FR | 3066881 | A1 | 12/2018 |

OTHER PUBLICATIONS

CN_1754418_A_-_Tofani_English_translation (Year: 2006).*
International Search Report and Written Opinion of the ISA for PCT/EP2021/087644 dated Mar. 16, 2022, 16 pages.

* cited by examiner

PROCESSING MACHINE FOR FIBRE PLANTS

This application is the U.S. national phase of International Application No. PCT/EP2021/087644 filed Dec. 24, 2021 which designated the U.S. and claims priority to BE Patent Application No. 2020/5983 filed Dec. 24, 2020, the entire contents of each of which are hereby incorporated by reference.

The present invention relates to a processing machine for processing relatively short fibre plants such as flax and relatively long fibre plants such as hemp.

Numerous different machines have been developed over time for harvesting and subsequent processing of fibre plants. On one hand there are picking machines with which the fibre plants can be picked and with which the picked fibre plants can be placed flat on the ground surface in rows (swathes). On the other hand so-called turners have been developed with which fibre plants, once they have been placed down flat on the ground at an earlier stage, can be picked up, be turned over and can be placed back onto the ground in overturned position. Numerous variants of these two types of processing machine are in turn known. All these variants are however configured only to turn relatively short fibre plants, such as flax. Considering the great differences in properties between the different fibre plants, including the properties such as length, but also the composition of the plants, a separate processing machine is in principle utilized for each processing step and for each fibre plant. It has as yet not been found possible to develop a processing machine with which the different types of fibre plant and/or different types of processing thereof can be realized in one machine.

It is an object of the invention to provide a processing machine which is improved and/or can be applied in versatile or even universal manner, and in which at least one of the above stated drawbacks is obviated. It is another object to provide a processing machine which is suitable for alternating processing, particularly picking and/or picking up, of fibre plants of different lengths, particularly flax and hemp.

According to a first aspect, at least one of these objects is achieved in a processing machine for selectively processing relatively short fibre plants such as flax and relatively long fibre plants such as hemp, the processing machine comprising:

- a self-propelling vehicle comprising a vehicle chassis with arranged thereon at least four wheels and a drive motor for driving at least two, preferably all, wheels, wherein the vehicle chassis is provided with:
  - a first conveyor for transporting at least parts of the fibre plants from a first end to an opposite second end, and a second conveyor for transporting at least parts of the fibre plants from the first end to the second end;
  - first and second delivering units provided at or close to the second end for the purpose of delivering and placing on the ground surface the fibre plants coming from respectively the first and second conveyor;
  - wherein the vehicle chassis comprises first mounting means for mounting of, as desired, either a first exchangeable picking unit or a second exchangeable picking unit; and
- a first exchangeable picking unit configured to pick and further process the relatively short fibre plants, wherein the first picking unit comprises a first picking unit frame and second mounting means for mounting the first picking unit frame releasably on the first mounting means of the vehicle chassis of the self-propelling vehicle;
- a second exchangeable picking unit configured to pick and further process the relatively long fibre plants, wherein the second picking unit comprises a second picking unit frame and third mounting means for mounting the second picking unit frame releasably on the first mounting means of the vehicle chassis of the self-propelling vehicle.

Both relatively short fibre plants such as flax and relatively long fibre plants such as hemp can thus be processed in a selective manner with one and the same vehicle. The processing can here comprise of picking or harvesting the fibre plants. In a further embodiment the machine is also configured or can also be configured to pick up previously harvested fibre plants. In such embodiments the processing machine comprises an exchangeable collecting unit configured to collect up previously picked, processed and delivered fibre plants, wherein the exchangeable collecting unit comprises a collecting unit frame and fourth mounting means for the purpose of mounting the collecting unit frame releasably on the first mounting means of the vehicle chassis of the self-propelling vehicle.

Although there are embodiments in which the different processing units have differently embodied mounting means for mounting the relevant processing unit on the vehicle, the processing machine is preferably embodied such that the second, third and fourth mounting means take substantially the same form. This enables the processing unit to be mounted on or conversely be released from the vehicle more easily, this making the processing units more easily interchangeable.

The exchangeable picking units, and preferably also the exchangeable collecting unit, are preferably embodied to be carried wholly by the vehicle chassis of the vehicle. In other words, no wheels or other support means are arranged on the frame of the processing unit, for instance the picking unit or collecting unit. The processing unit is supported only by the vehicle itself.

In determined embodiments of the invention the mounting means are configured to make the relevant picking unit or pick-up element pivotable relative to the vehicle chassis. The pivotability makes the machine suitable for numerous applications, soil conditions and other circumstances. At least one lifting unit is preferably provided whereby an arranged processing unit can be pivoted upward or downward as desired. The lifting unit preferably forms part of the vehicle, and in principle not of the processing unit. This means that each of the different processing units can be controlled by one collective lifting unit. This makes it possible to realize the interchanging in particularly simple and rapid manner.

In embodiments of the present disclosure the second exchangeable picking unit for picking relatively long fibre plants comprises:

- a lower picking element and an upper picking element for picking respectively a lower part of the fibre plants and an upper part of the fibre plants, and
- a cutting element configured to cut the fibre plants in the lower part and upper part,
- wherein the upper picking element of the second exchangeable picking unit comprises an upper transport installation for gripping and transporting the upper part of the fibre plant to the first conveyor of the vehicle and the lower picking element of the second exchangeable picking unit comprises a lower transport installation for gripping and transporting the upper part of the fibre plant to the second conveyor of the vehicle.

The lifting unit of the vehicle can be configured to set the height of the relevant picking unit/pick-up element relative to the vehicle and thereby relative to the ground surface, optionally during travel, so that the processing process of the fibre plants can for instance be optimally adapted to the local conditions.

In a particularly advantageous embodiment the exchangeable picking unit for picking the relatively long fibre plants comprises a lower picking element and an upper picking element which are configured to pick respectively a lower part of the fibre plants and an upper part of the fibre plants. Parts of the relatively long fibre plants can therefore be processed (for instance harvested) simultaneously, this resulting in a great processing capacity of the processing machine.

In determined embodiments a cutting element is provided, also referred to here as a mowing element, which is configured to cut the fibre plants for the purpose of thereby dividing the fibre plants into a lower part and upper part. In this way the long fibre elements can be processed better and more efficiently, and it is also possible to place the fibre plants down on the ground in two (or more) rows in order to allow retting thereof on the land. It is advantageous here to mount the cutting element on the upper picking element. In determined embodiments the cutting element is constructed from a (horizontal) row of mutually reciprocally displaceable blades in which a large amount of fibre plants can be cut, this row extending over a substantial or substantially whole width of the upper picking element. The reciprocal displacement of the blades of such a cutting unit is driven by a motor, for instance an electric motor. The cutting unit is further preferably mounted on the upper picking element such that the height of the cutting unit relative to the rest of the picking element and thereby the height of the cutting unit relative to the ground surface can be adjusted as desired (for instance depending on plant length) and/or to allow the upper element to engage on the fibre plants first, and process them further, during travel. In order to make fibre plants into two (or more) parts of suitable lengths the upper picking element is embodied for pivoting relative to the first picking element so that the pivot position of the second picking element relative to that of the first picking element can be set in simple manner. By moreover mounting the upper picking element pivotally on the lower picking element, and so not mounting it on the vehicle chassis, the manner of mounting of the processing unit on the vehicle can remain extremely simple. The interchanging of the processing units can be realized quickly, efficiently and without a great deal of technical knowledge about the vehicle.

The processing unit of the processing machine can comprise one or more own transport installations for gripping fibre plants and transporting the gripped fibre plants to the first and second conveyors of the vehicle. This makes the processing of the fibre plants in the sense of harvesting, picking up and optionally rotating the position of the fibre plants a task for the processing unit. This means that the vehicle itself need not in principle be modified when one processing unit is exchanged for another processing unit.

The transport installation can be configured to rotate the fibre plants during transport. When the collecting unit is used, this rotating comprises for instance of wholly turning over picked-up fibre plants, which fibre plants are located flat on the ground surface after a previous processing step (i.e. after the fibre plants were picked on the front side of the relevant picking unit and placed back down onto the ground on the rear side of the vehicle at an earlier stage). When a picking unit is used, this rotating comprises for instance of rotating the fibre plants picked in substantially vertical position to a horizontal position, in which latter position they can for instance be easily moved on to the delivering unit by a first or second conveyor on the self-propelling vehicle itself.

More particularly, in determined embodiments the transport installation of the first and second picking unit can be configured to turn the fibre plants from a substantially upright position to a substantially lying position and/or the transport installation of the collecting unit can be configured to turn the fibre plants from a substantially lying position to an overturned, substantially lying position.

If a transport installation is arranged on the first picking unit, second picking unit and/or the collecting unit, this means that many if not all of the necessary processes on different types of fibre plant can be performed wholly on the processing unit in question. The vehicle therefore need not be modified in any way to the type of fibre plant to be processed.

Harvesting of the fibre plants can be brought about by a transport installation comprising at least one pair of endless conveyor belts which are configured to grip fibre plants therebetween and transport them in gripped state. This transport installation, more particularly the endless conveyor belts, are preferably driven by one or more rollers (these including drums, pulleys and so on), wherein each of the driven rollers is coupled to its own hydraulic motor for rotation thereof. Other means, such as mechanical transmissions and the like, can be dispensed with. The transport installation(s) of the processing unit can hereby take a relatively light and simple form, wherein there is also the option to drive the conveyor belts individually, for instance at different speeds, as far as desirable.

Each of the processing units is preferably provided with its own transport installation, so that when the processing units are exchanged it is in principle not necessary to take into consideration mutually differing transport installations used for the different applications.

In determined embodiments the harvested fibre plants also undergo a pressing process, also referred to here as a compacting process. Each of the picking units can for this purpose be provided with one or more pressing rollers for pressing fibre plants transported therealong. Pressing the fibre plants enhances the retting process of the fibre plants placed back down onto the ground later. The pressing can break the bast in the fibre plant. The fibre plants can be retted better with a broken bast. The pressing rollers can be positioned upstream or downstream of an optional further cutting unit whereby the top parts and/or root parts of the fibre plants can be cut off No pressing rollers are therefore needed on the vehicle itself.

As described above, the harvested fibre plants can optionally also undergo cutting processes. The first picking unit and/or the second picking unit can comprise a root cutting unit configured to cut a root part off the rest of the fibre plant and/or a top cutting unit configured to cut the top part off the rest the fibre plant. At least one of the root cutting unit and top cutting unit is preferably arranged for lateral displacement on the frame of the picking unit and provided with at least one actuator, such as a lifting cylinder with lying orientation, for setting the lateral cutting position and thereby the length of the parts of the fibre plants to finally be transported to respectively the first and second conveyor on the vehicle by displacing the relevant cutting unit in lateral direction.

In determined embodiments the vehicle itself is also provided with a collecting element on the vehicle chassis of the self-propelling vehicle for the purpose of collecting and storing therein cut-off parts of picked fibre plants, particularly root parts and/or top parts of fibre plants such as hemp plants.

When there is a cutting unit for cutting off the top parts, the processing machine can also comprise first discharge means for discharging the cut-off top parts from the top cutting unit to a collecting element on the self-propelling vehicle, wherein the first discharge means preferably comprise a discharge conduit and a suction pump for the purpose of collecting and extracting cut-off top parts. The object hereof is to store the cut-off top parts of the fibre plants so that the tops can be stored in the collecting element.

In determined embodiments second discharge means are alternatively or additionally provided for the purpose of discharging the cut-off root parts from the root cutting unit to the ground surface, wherein the second discharge means are preferably configured for depositing on the ground in front of one or more wheels of the vehicle in axial direction. In this way the root parts can be driven into the ground.

According to another aspect, a method is provided for processing, as desired, relatively short fibre plants such as flax or relatively long fibre plants such as hemp with a processing machine according to any one of the foregoing claims, the method comprising of

- mounting, as desired, the first picking unit on the self-propelling vehicle if relatively short fibre plants must be picked or the second picking unit on the self-propelling vehicle if relatively long fibre plants must be picked or, optionally, the collecting unit for picking up fibre plants already delivered to the ground surface;
- driving the processing machine over the ground surface and, using the processing installation, respectively picking the relatively short fibre plants, picking the relatively long fibre plants or picking up fibre plants lying on the ground, and then processing the fibre plants and thereafter placing the processed fibre plants back onto the ground.

The method can further comprise of driving the vehicle over the ground surface and, while travelling over the ground:

- gripping upper parts of the fibre plants with the second picking element;
- cutting the gripped upper parts of the fibre plants loose with the cutting unit;
- transporting the upper parts of the fibre plants which have been cut loose to the first conveyor of the vehicle;
- gripping the lower parts of the fibre plants with the first picking element;
- transporting the gripped parts of the fibre plants to the second conveyor of the vehicle;
- transporting the upper and lower parts of the fibre plants on respectively the first and second conveyor;
- placing the upper parts of the fibre plants on the ground in a first row with the first delivering unit; and
- placing the lower parts of the fibre plants on the ground in a second row, parallel to the first row, with the second delivering unit.

The method preferably comprises of pivoting the first picking element and/or the second picking element relative to the vehicle, preferably also of pivoting the cutting unit relative to the second picking element, for the purpose of setting the length ($l_o$) of the lower parts and the length ($l_b$) of the upper parts of the fibre plants.

The method preferably comprises of pulling the lower parts including root parts loose from the ground after the lower parts of the fibre plants have been gripped, wherein transporting of the gripped lower parts comprises of transporting the lower parts of the fibre plants which were gripped and then pulled loose.

The method preferably comprises of cutting the top parts off the upper parts which were cut loose and/or cutting the root parts off lower parts of the fibre plants.

The method preferably comprises of pressing the lower parts and/or upper parts of the fibre plants, this in order to improve the retting process.

Further advantages, features and details of the invention will be elucidated with reference to the following description of some embodiments thereof. Reference is made in the description to the accompanying figures, in which:

FIG. 1 is a partially cut-away side view of an embodiment of a vehicle according to the invention;

FIG. 4 is a side view of a processing machine according to an embodiment of the invention, wherein a processing unit 3 is mounted on vehicle 1 and is suitable for processing of long fibre plants;

FIG. 10 is a further side view of the embodiment of FIG. 5;

FIG. 11 is a side view of a processing machine according to an embodiment of the invention, wherein a processing unit 3 is mounted on vehicle 1 and is suitable for processing of short fibre plants;

Figure 13:
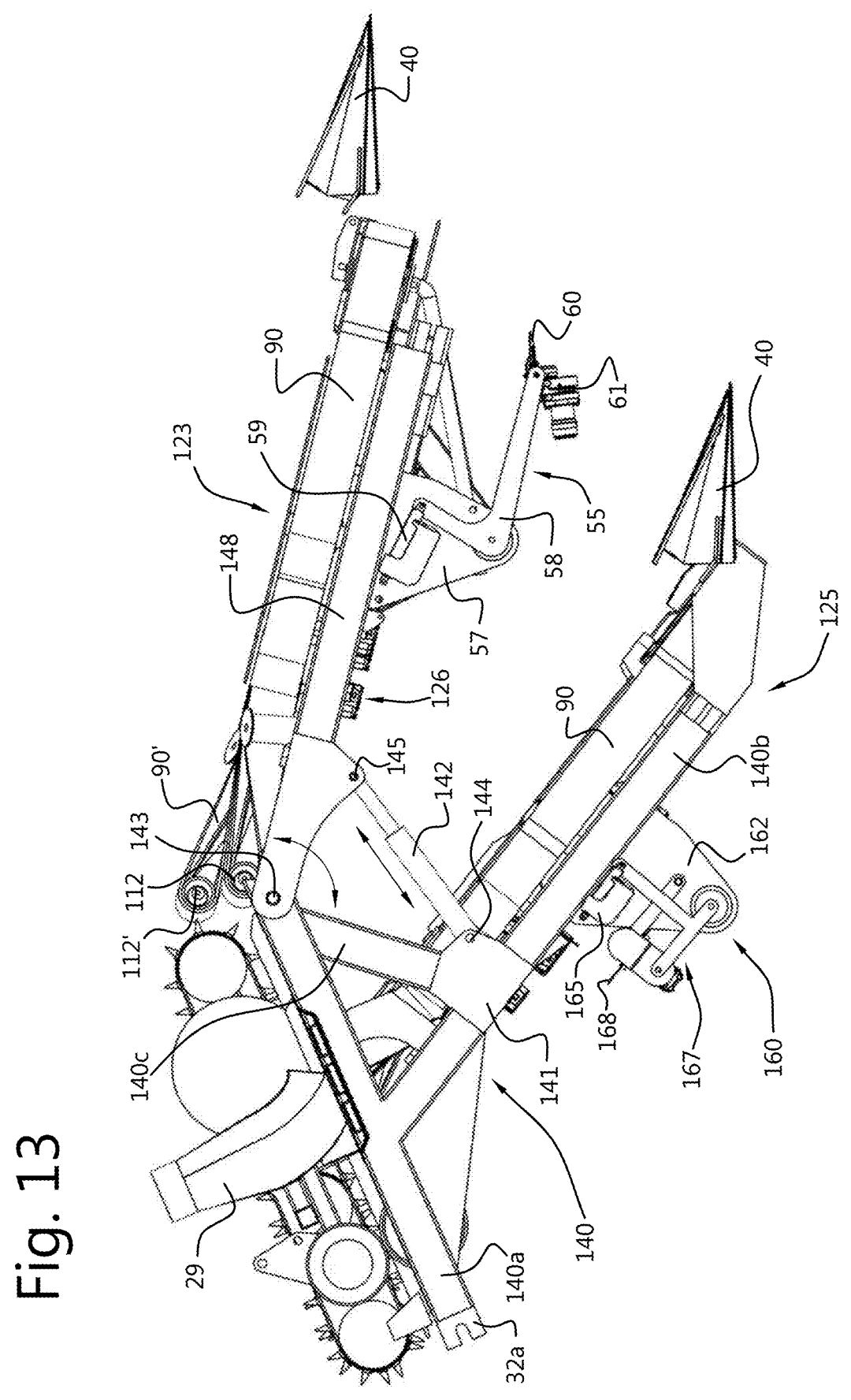
Figure 14:
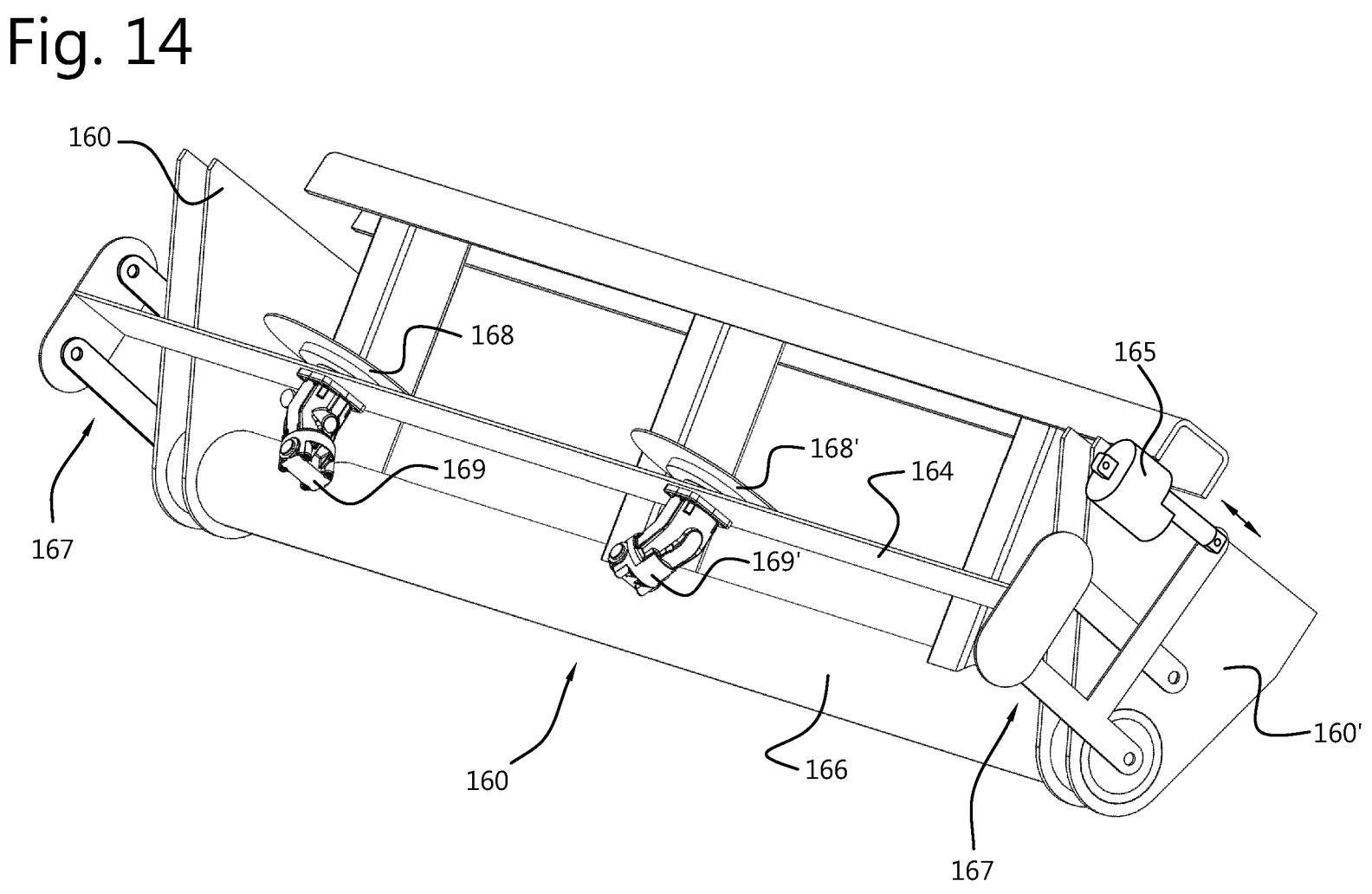
Figure 15:
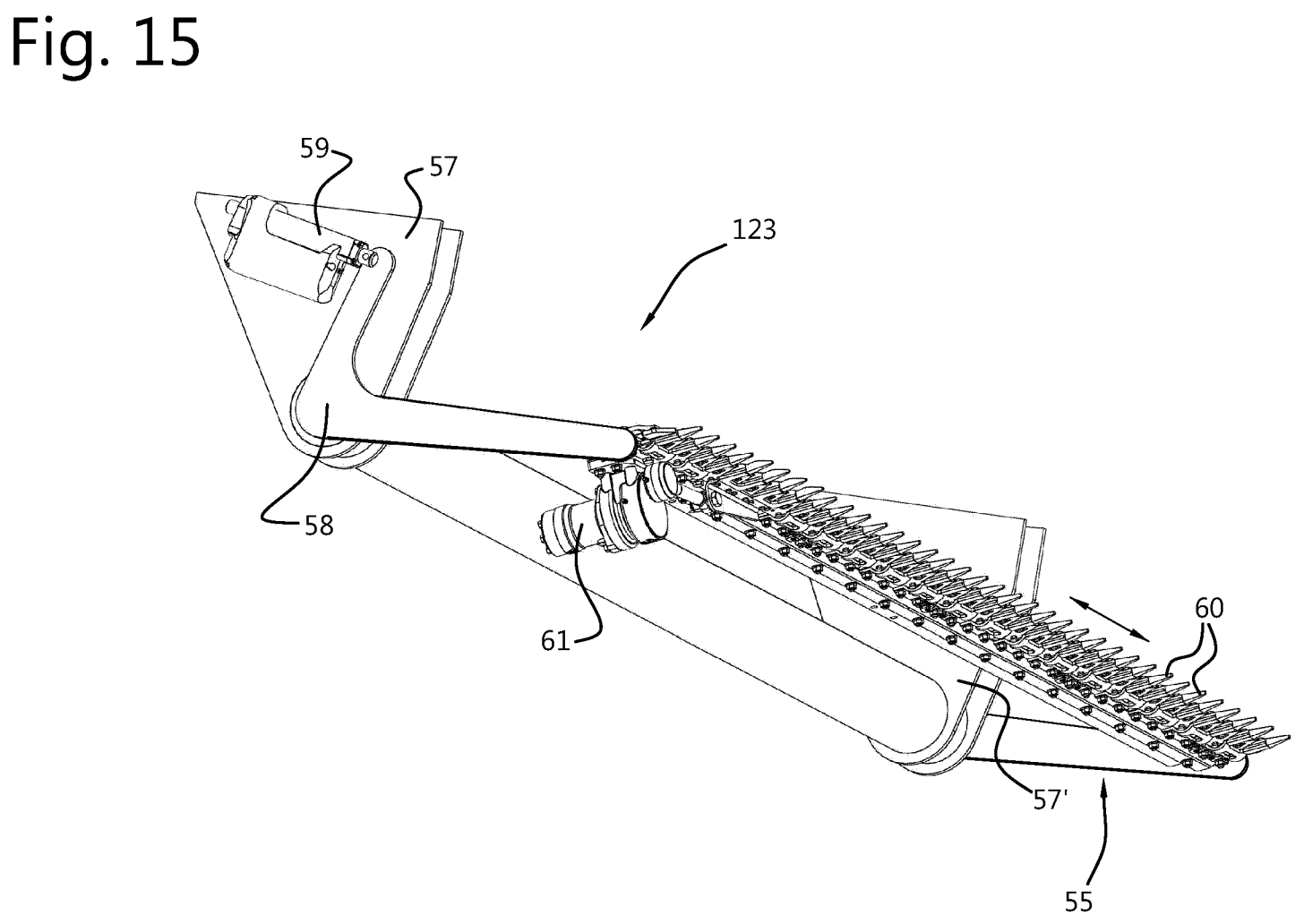
Figure 2:
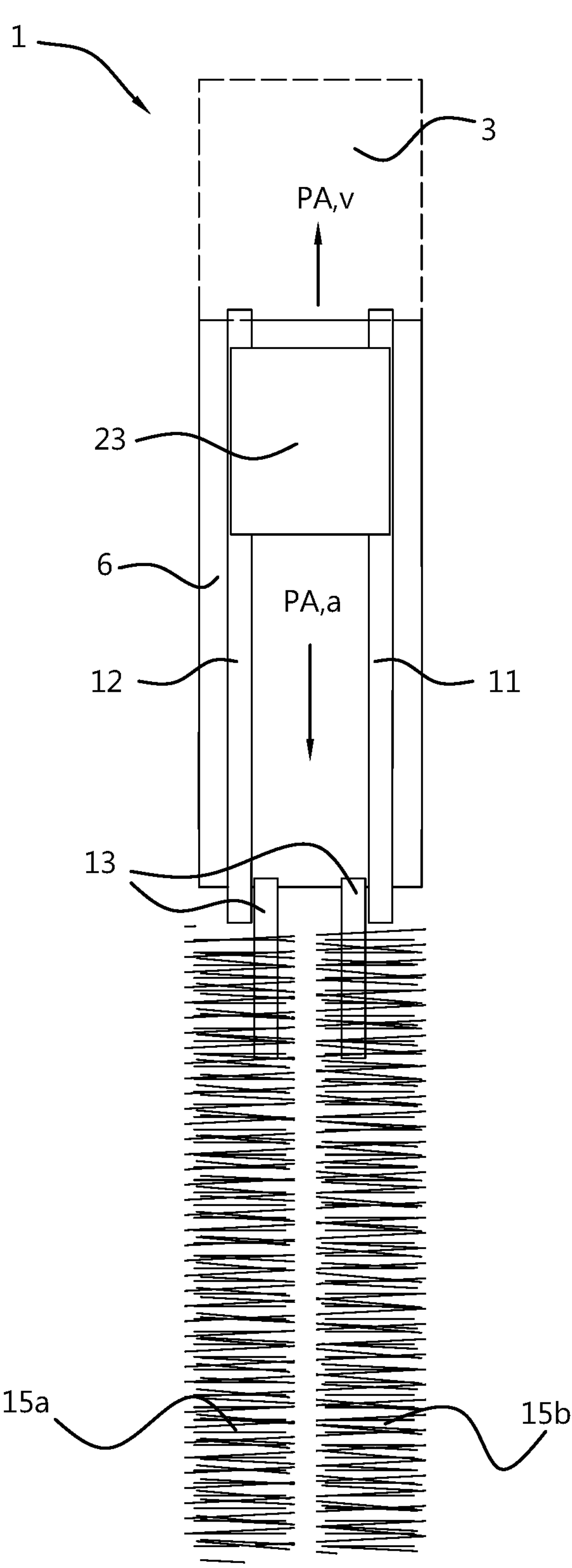
FIG. 2 is a schematic top view of the vehicle of FIG. 1, provided on the front side with a processing unit.

FIGS. 13-15 are views of a further embodiment of the processing machine according to the invention, wherein FIG. 13 is a side view of a further embodiment of a hemp picking unit with an alternative mounting of the picking elements on each other and on the vehicle chassis, FIG. 14 a detail view of the root cutting unit of FIG. 13, and FIG. 15 is a view of the cutting unit or mowing unit for cutting loose the upper parts of fibre plants from the lower parts thereof, as can be applied in all embodiments.

Flax is a fibre crop which is cultivated for making linen, among other things. The flax plant is usually between 80 and 120 cm long, and is harvested using a drawn or self-propelling flax picking machine. For this purpose the flax picking machine has on the front side a picking unit embodied specifically to pull the flax plants from the ground. The harvested flax plants are then processed by the flax picking machine by displacing them to the rear side of the flax picking machine and placing the flax plants on the ground surface during travel. The flax plants are placed flat on the ground in long rows, also referred to as "swathes", wherein the stems of the harvested flax plants extend substantially transversely of the longitudinal direction of the swathes. This placing back of the flax flat onto the ground surface so that said swathes are created is also referred to as "depositing" or "picking up". When the flax plants are placed in rows or swathes, an intermediate space is left between adjacent rows. These spaces are provided in order to prevent the swathes from becoming tangled in each other.

The harvested flax plants which were placed flat on the ground in swathes are then retted under the influence of a combination of dew, rain and sunlight. The retting of the flax by leaving the flax plants on the ground (i.e. a field or retting field) for some time is referred to in the field of processing flax as field retting or dew retting. In order to obtain a uniform retting and to prevent rotting of the flax, the flax placed flat on the ground in rows must be flipped over regularly. This flipping over of the flax placed flat on the ground is also referred to as "turning". The turning of the flax is performed using a drawn or self-propelling flax turner.

Hemp is likewise a fibre crop which is cultivated for making textile fabrics or rope, among other things. The hemp plant is a lot longer than the flax plant. The hemp plant is characteristically between 140 cm and 240 cm in length. The hemp is usually cut at the base of the hemp plant and then processed further.

This would therefore already necessitate at least four different machines to enable optimal processing of both hemp and flax. This results in high purchase, use and maintenance costs. In embodiments of the present invention a processing machine is provided which is suitable in principle for harvesting/picking and/or turning relatively long fibre plants such as hemp or kenaf and relatively short fibre plants such as flax.

Figure 1:
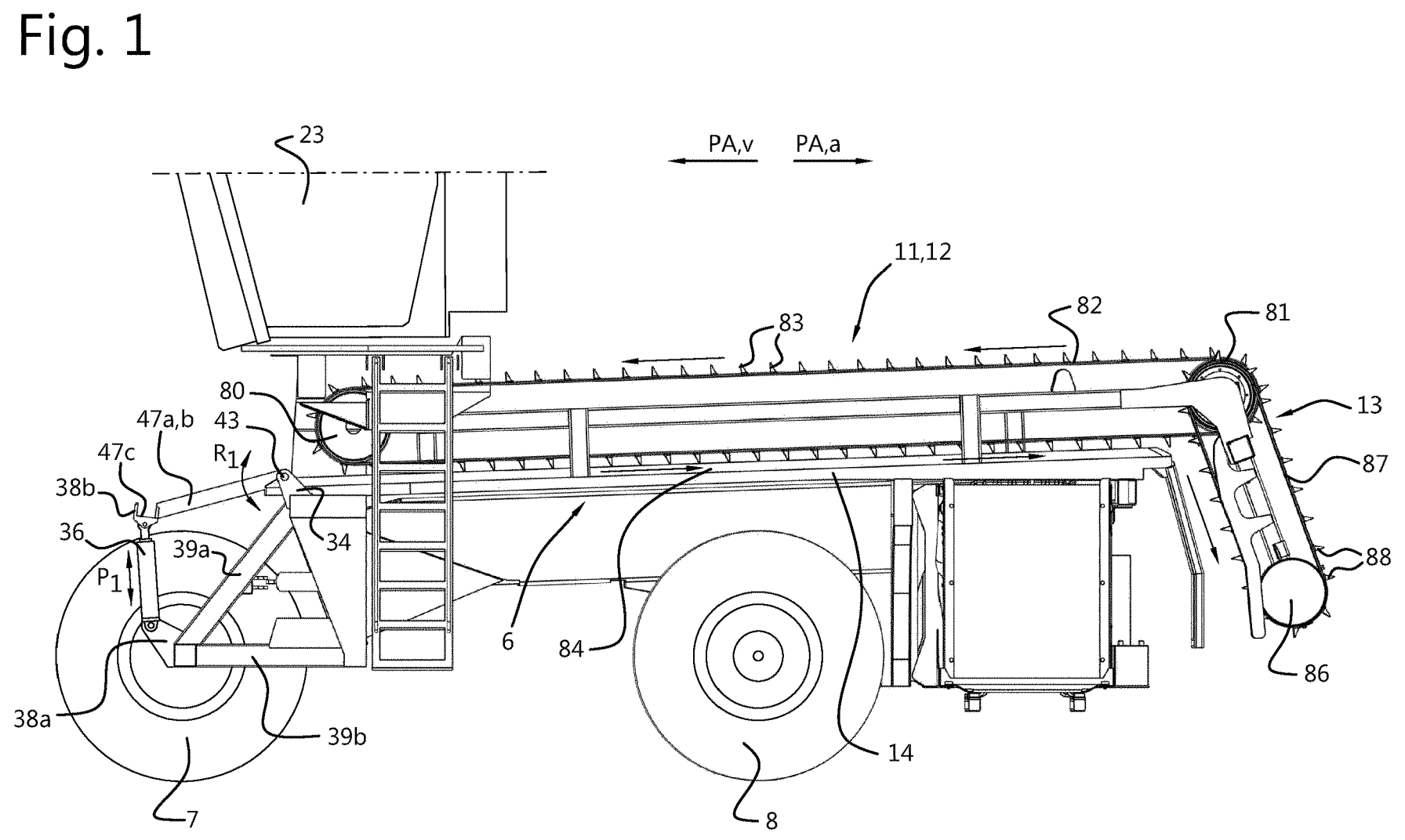

FIG. 1 shows a self-propelling vehicle 2 of a processing machine 1 according to a determined embodiment of the invention. Self-propelling vehicle 2 comprises a vehicle chassis 6 on which four wheels, i.e. two front wheels 7 and two rear wheels 8, are arranged in known manner. In FIG. 1 a part of the front left side of the vehicle has been cut away (i.e. the front left wheel and the relevant part of the wheel suspension) in order to obtain a better view of the construction of the vehicle on the front side. The vehicle is self-propelling, which means that it is provided with its own drive motor whereby a number of the wheels, for instance the two rear wheels, or all the wheels can be driven. The vehicle is steered from a driver's cab 23 on the front side of the vehicle. Chassis 6 comprises two parallel conveyors 11, 12 formed by a loading floor or platform 14 and two endless conveyor belts provided thereabove. At least one of the endless conveyor belts can here be adjusted in lateral direction so that the intermediate distance between the two conveyor belts can be adjusted, this in order to realize a suitable intermediate distance for shorter or longer swathes. Referring to the top view of FIG. 2, the two conveyors 11, 12 are arranged along both longitudinal edges of vehicle 2 so that a quantity of fibre plants can be transported in axial rearward direction ($P_{A,a}$) with each of these. In the shown embodiment each of the conveyors 11, 12 comprises an endless conveyor belt 82 which runs on a front roller 80 and a rear roller 81. At least one of the rollers 80, 81 is driven via a drive (not shown). In a determined embodiment the drive comprises a hydraulic motor arranged in the rear (triple) pulley or roller 81. Each of the respective part-rollers of the multiple (triple) pulley is driven separately yet synchronously to each other, preferably according to a determined ratio as desired. So-called carriers 83 are provided on the outer side of conveyor belt 82. These can displace the fibre plants lying on platform 14, at least on guide rails 84 of the platform (FIG. 1), in said axial rearward direction ($P_{A,a}$) to the rear side of chassis 6. The fibre plants are thus enclosed here between conveyor belt 82 and guide rails 84.

On the rear side of vehicle 2 a delivering unit 13 is arranged for each conveyor 11, 12. In the shown embodiment the delivering unit 13 comprises an endless belt conveyor 87. The endless belt of each of the endless belt conveyors 87 is trained around a roller 86 and around said roller 81 (a belt conveyor 87 therefore sharing this with a conveyor 11 or 12). Driving of delivering unit 13 takes place the first roller 81. This extends obliquely rearward to some extent and is configured to displace the fibre plants coming from respective conveyor 11, 12 downward in dosed and controlled manner so that the fibre plants can be placed on the ground on the rear side of the vehicle. As shown in FIG. 2, when the vehicle moves in an axial forward direction ($P_{A,v}$), the fibre plants (v) picked or picked up on the front side of the vehicle will be displaced to the rear side of vehicle 2 and will each be placed down on the ground (o) in a separate row 15*a*, 15*b* via delivering units 13. In determined applications the rows 15*a*, 15*b* of fibre plants are composed of the same parts of the fibre plant, for instance in the case of the relatively short flax plants. In other embodiments the one row is however composed of the lower portions of the harvested fibre plants, while the other row consists of the upper portions of the harvested fibre plants. This is for instance the case when hemp plants are harvested. In both cases the fibre plants are placed flat on the ground, parallel to each other as far as possible, after which said retting can commence.

Vehicle 2 is provided with a processing unit 3 on its front side in order to be able to pick the fibre plants or to be able to pick fibre plants already placed flat on the ground at an earlier stage back up again. A picking unit is arranged on the front side in the case that the fibre plants are being picked, while a processing unit 3 will be a collecting unit in cases where fibre plants which have already been picked and placed on the ground previously are being picked up. A different picking unit will further be mounted on the vehicle depending on the length of the crop to be picked.

Figure 3:
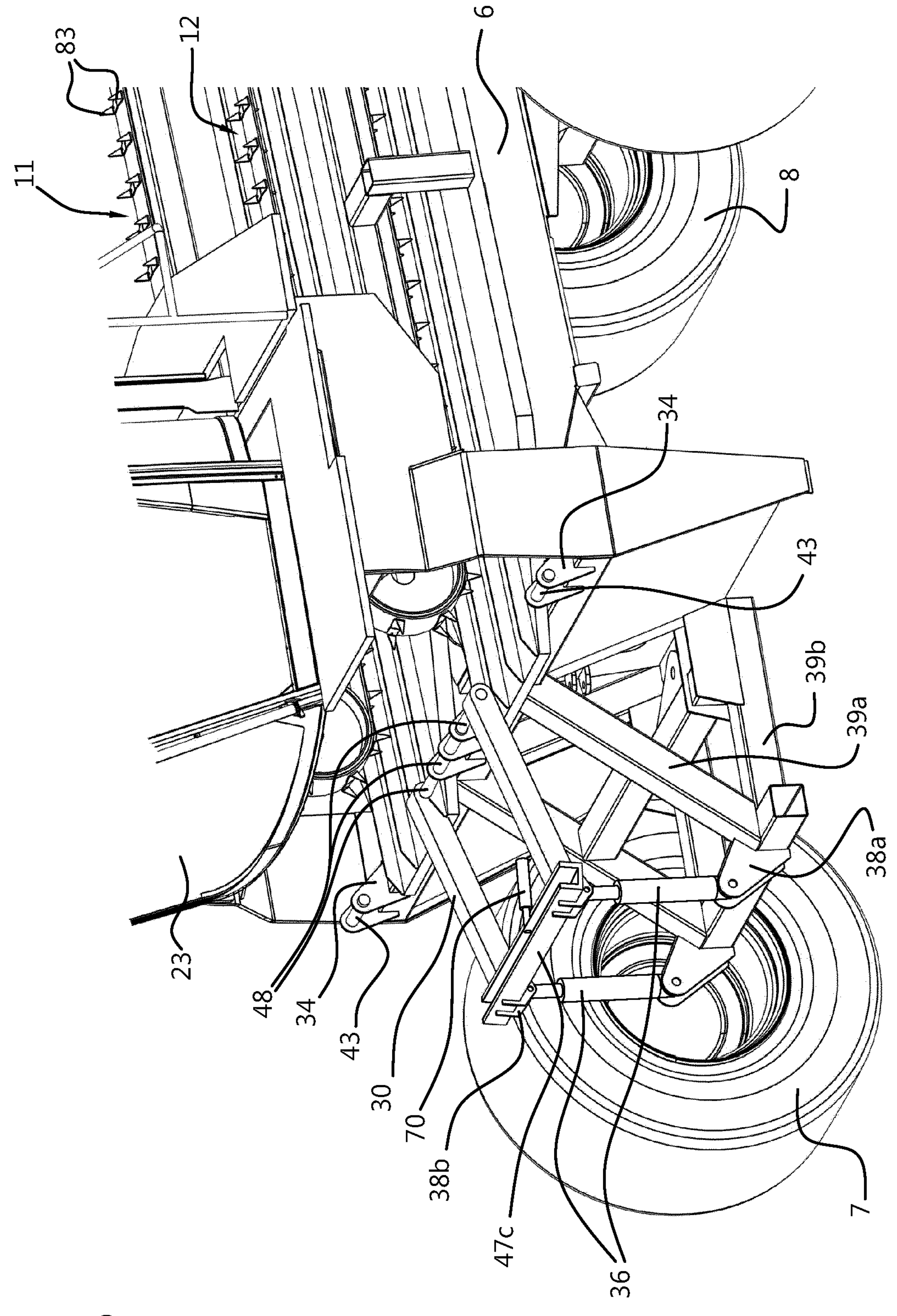
FIG. 3 is a partially cut-away perspective side view of the embodiment of the vehicle according to FIGS. 1 and 2.

Referring to FIGS. 1 and 3 in particular, the chassis comprises on the front side of chassis 6 of vehicle 2 a number of support chassis parts 39*a*, 39*b*. The support chassis parts 39*b* extend in line with the rest of chassis 6 of vehicle 2, while the support parts 39*a* mounted on support parts 30*b* and the rest of chassis 6 are disposed obliquely. Chassis 6 is further provided with a number of hinges 48 on which two parallel longitudinal lifting arms 47*a*, 47*b* are arranged. Both longitudinal lifting arms 47*a*, 47*b* are connected at their outer ends to a transverse lifting arm 47*c*. The support chassis parts 39*a*, 39*b*, longitudinal lifting arms 47*a*, 47*b* and transverse lifting arm 47*c* together form a strong and stable support structure for mounting a number of actuators whereby a processing unit 3 coupled to the chassis 6 of vehicle 2 can be pivoted upward and downward. Together with these actuators the support structure forms the above stated lifting unit.

The pivoting of processing unit 3 is brought about by a number of actuators, for instance electric motors or, preferably, lifting cylinders 36, of the lifting unit. In FIGS. 1 and 3 the actuators are formed by two lifting cylinders 36. In the shown embodiment two lifting cylinders positioned laterally adjacently of each other are provided. In other embodiments use is however only made of a single lifting cylinder, or three or more lifting cylinders are applied. The lifting cylinders are mounted pivotally on the support chassis parts 39*a*, 39*b* via hinges 38 and on transverse lifting arm 47*c* via a mounting support 38*b*. A further description of the construction of the lifting unit and of the operation thereof will follow below.

Referring to FIG. 3, chassis 6 is provided on either side of the support chassis parts 39*a*, 39*b* with first mounting means 34 for mounting a processing unit 3 thereon in pivotable and releasable manner. The first mounting means 34 can be embodied in numerous ways, but in the shown specific embodiment comprise a number of flanges in which respective pivot shafts 43 can be rotatably mounted.

Each of the different processing units 3 comprises one or more frame parts which can be mounted in pivotable and releasable manner on said first mounting means 34. In the embodiments shown in FIGS. 4-9 the processing unit 3 comprises a first, lower hemp picking element 25 and a second, upper hemp picking element 26 placed thereabove. The lower hemp picking element comprises a frame part 30 which can be mounted pivotally and in easily releasable manner on first mounting means 34 of the vehicle using second mounting means 32. The upper hemp picking element 26 comprises a frame part 33 which also takes a pivotable (yet not necessarily easily releasable) form, albeit that in the shown embodiment frame part 33 of the upper hemp picking element 26 is mounted on the frame part 30 of the lower hemp picking element 25 instead of directly on chassis 6 of the vehicle. In other embodiments (not shown) it is however precisely the upper hemp picking element that is mounted on chassis 6 of vehicle 2, and the lower hemp picking element on the upper hemp picking element. In still further embodiments (not shown) the two hemp picking elements are mounted pivotally and releasably on vehicle 2.

For mounting on the chassis 6 of vehicle 2, more particularly on the first mounting means 34 thereof, such as the flanges 34 positioned on or close to the sides of vehicle 2 and having the pivot shafts 43 mounted therein, the processing unit 3, in the shown embodiment the lower hemp picking element 25, is provided with second mounting means 32. The second mounting means 32 are embodied for easy mounting on first mounting means 34. The first and second mounting means 34, 32 together form a mounting hinge between processing unit 3 and vehicle 2, such that processing unit 3 can be pivoted in upward and downward direction around the lying pivot shafts 43 (pivoting direction $R_1$, FIG. 9).

To make processing unit 3 pivot relative to vehicle 2 the above-described lifting unit is utilized. As described above, the lifting cylinders 36 are arranged rotatably on the flanges 38*a* of chassis 6 at one outer end. On their opposite sides the lifting cylinders 36 are coupled via mounting supports 38*b* to the transverse lifting arm 47*c*. Transverse lifting arm 47*c* of the lifting unit has a substantially U-shaped cross-section, which is clearly visible particularly in FIGS. 1 and 3. The U-shape forms a receiving space for a part of the frame part 30 of the lower hemp picking element 25. In other words, the processing unit 3 can be connected to the lifting unit in simple manner by placing frame part 30 of lower hemp picking element 25 into the transverse lifting arm 47*c* of the lifting unit from above or, conversely, by simply pressing transverse lifting arm 47*c* against frame part 30 from below. Finally, the whole is locked by a locking mechanism 70 (FIG. 3), for instance in the form of a remotely controllable extending cylinder which in extended state ensures that processing unit 3 remains locked to the lifting unit. The lifting unit is then ready to lift processing unit 3.

As shown with arrows ($P_1$) in the figures, the length of lifting cylinders 36 is controllable. It will be apparent that when the length of lifting cylinders 36 is increased, frame part 30 will pivot upward, while frame part 30 will pivot downward if the length of lifting cylinders 36 is reduced. In this way the height of the free end of the processing unit can be varied, for instance in order to adjust the position in which the processing unit grips the fibre plants and pulls them from the ground during travel of the vehicle.

The mounting means of each of the different processing units 3 are essentially identical. This means that the different processing units can not only be easily mounted on and detached from the vehicle, but that this can also take place in a uniform manner. It is noted here that when processing units 3 are exchanged, only the mounting means of processing unit 3 (i.e. the second mounting means 32 when the processing unit is a picking unit for long fibre plants, third mounting means when the processing unit is a picking unit for short fibre plants and fourth mounting means when the processing unit is a turning unit for turning long or short fibre plants) need in fact be released from the first mounting means of the vehicle, after which processing unit 3, particularly the frame part 30 thereof, can be removed from the upper side of cylinder 36. By now simply pacing another processing unit 3 on the lifting unit of vehicle 2 and mounting the associated mounting means on the first mounting means of the vehicle, the user can easily make processing machine 1 suitable for the specific desired process, such as picking of short fibre plants, picking of long fibre plants or picking up and turning fibre plants.

As described above, FIGS. 4, 5, 8, 9A and 9B comprise an embodiment of a processing machine 1 according to the invention wherein the processing machine is provided with an exchangeable picking unit comprising a first picking element and a second picking element placed thereabove. The embodiment is embodied for picking of relatively long fibre plants, such as hemp plants, as shown schematically in the figure.

Figure 9A:
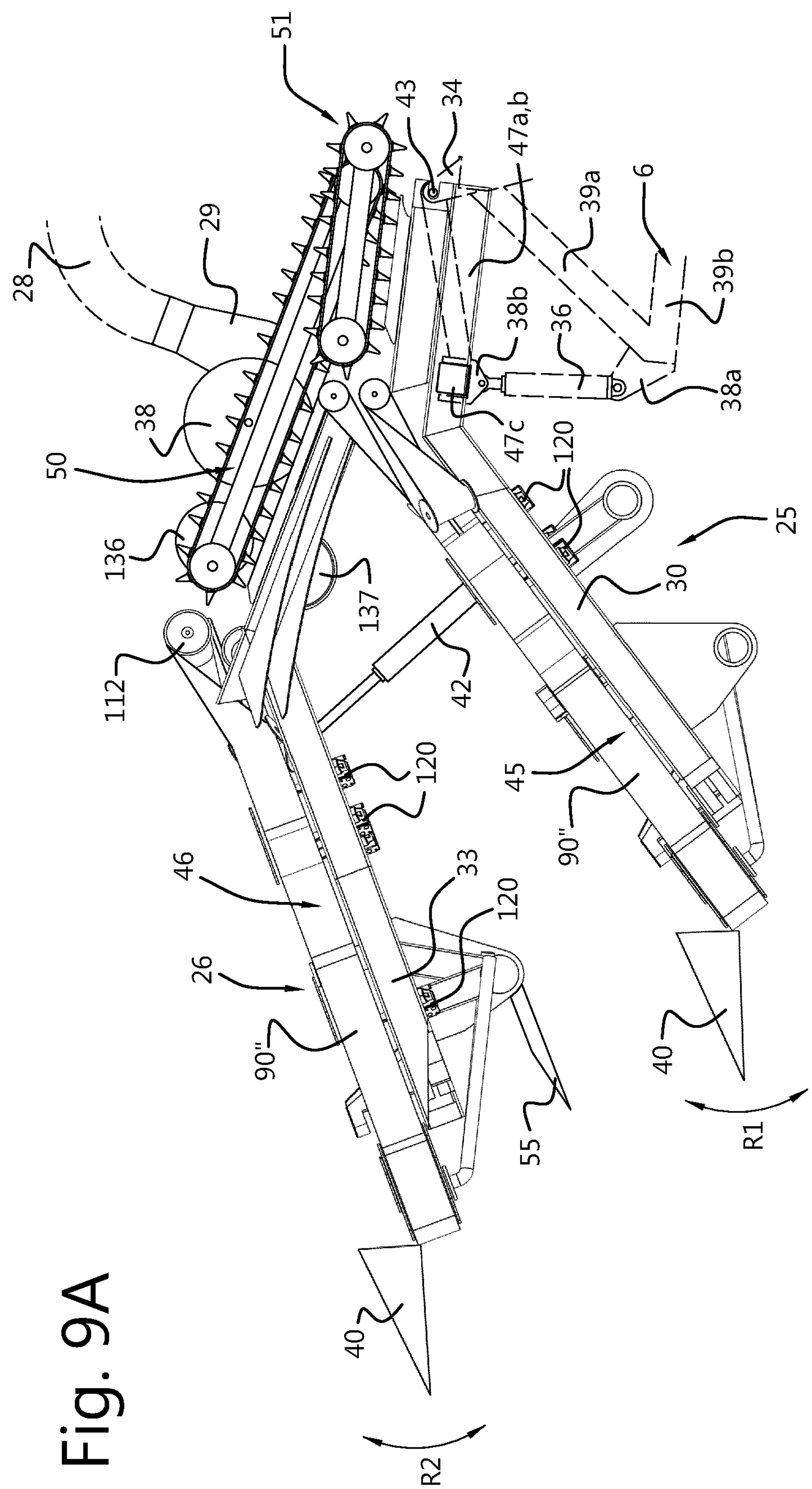
FIG. 9A is a side view of the embodiment of FIG. 5 with the lower processing element in a first pivot position.
Figure 9B:
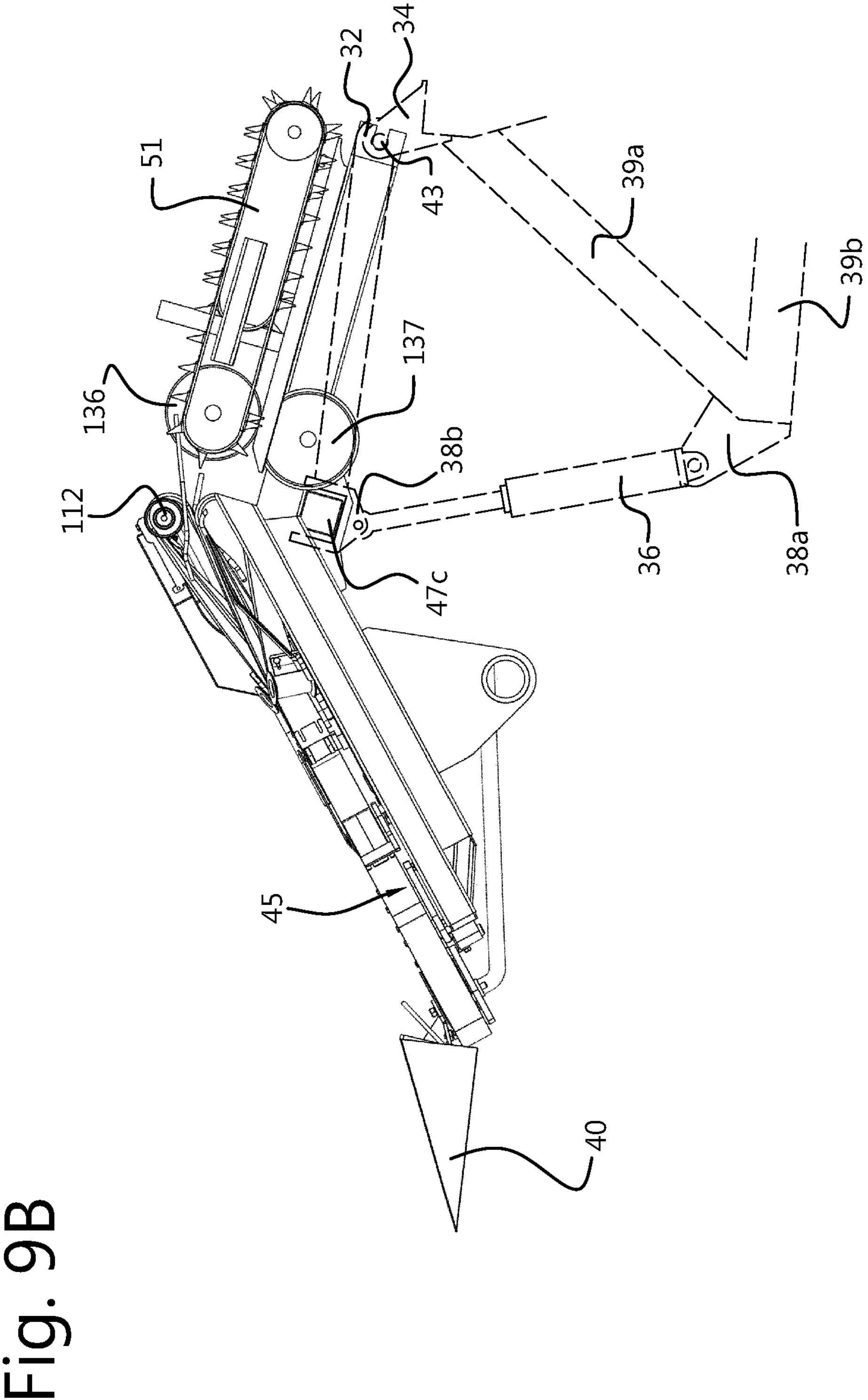
FIG. 9B is a side view of a part of the embodiment of FIG. 5 with the lower processing element in a second pivot position.

In the shown embodiment the processing machine 1 comprises the above stated self-propelling vehicle 2 and a specific processing unit 3, i.e. a hemp picking unit. The hemp picking unit comprises a lower hemp picking element 25 and arranged thereabove an upper hemp picking element 26. The lower picking element 25 is mounted on the first mounting means of the vehicle in the above stated manner, this such that the first hemp picking element 25 can be pivoted in upward and downward directions (pivoting directions $R_1$, FIG. 9A) by controlling said lifting cylinders 36 (FIGS. 9A and 9B). The upper hemp picking element 26 is pivotally arranged via pivot shafts 43 on the lower hemp picking element 25 so that the upper hemp picking element 26 can be pivoted (pivoting directions $R_2$) relative to the first hemp picking element 25 (and relative to vehicle 2 and the ground surface). The pivoting movement of the upper hemp picking element 26 relative to the lower hemp picking element 25 is driven by a number of further lifting cylinders 42 arranged on frame parts 30, 33 (FIG. 9A), wherein increasing the length of lifting cylinders 42 results in an upward rotation of the upper hemp picking element 26 relative to the lower hemp picking element 25, while reducing the length results in a downward rotation of the upper hemp picking element 26 relative to the lower hemp picking element 25.

Figure 4:
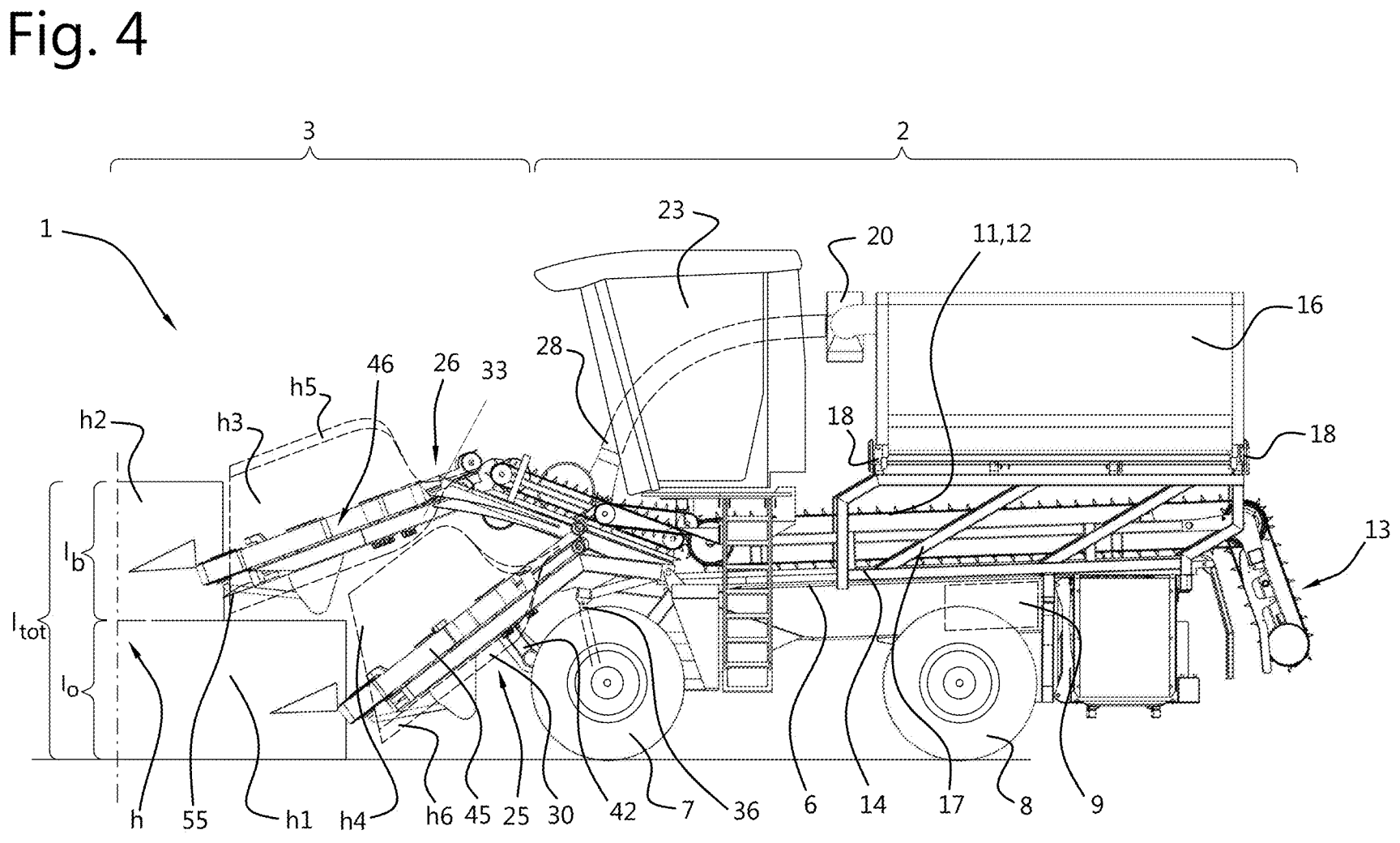

FIG. 4 shows schematically that the relatively long fibre plants (h), such as hemp, kenaf or similar fibre plants, have an overall length $l_{tot}$ (characteristically between 1.4 and 4.0 metres, 2.4 metres on average). The lower part ($h_1$) of each of the fibre plants (h) has a length $l_o$ (for instance 110 cm to 120 cm), while the upper part ($h_2$) has a length $l_b$ (for instance 120 to 130 cm). In the shown embodiment both lengths $l_o$ and $l_b$ are roughly the same, although in practice these lengths may of course differ. What is important is only that the fibre plants (h) are cut into at least two parts ($h_1$, $h_2$) and then processed further by processing machine 1. Said lower hemp picking element 25 is for this purpose made suitable for picking and processing the lower fibre plant parts ($h_1$), while the upper hemp picking element 26 is intended for picking the upper fibre plant parts ($h_2$).

The upper hemp picking element 26 comprises a transport installation 46 for gripping hemp plants and transporting them to vehicle 2, while the lower hemp picking element 25 comprises a (preferably wholly or almost wholly identical) transport installation 45 whereby hemp plants can likewise be gripped and transported to vehicle 2. When vehicle 2 travels in a forward direction ($P_{A,v}$), the upper hemp picking element 26 will reach the hemp plants first. After a short time interval the lower hemp picking element 25 will also reach these same hemp plants. In other words, the engaging position at which the upper hemp picking element 26 engages a determined hemp plant at a determined point in time is shifted relative to the engaging position at which the lower hemp picking element 25 engages a (different) fibre plant at the same point in time. This has the result that the upper hemp picking element 26 first engages the upper part ($h_2$) of the hemp plants and cuts them loose from the lower part ($h_1$) with a cutting element 55 (also referred to here as mowing element 55) provided on the front side of the upper hemp picking element 26, while it is after this, so only when upper part $h_2$ has been cut loose and is already being carried away, that the lower hemp picking element 25 will engage on the lower part ($h_1$) of the same hemp plant.

The lower hemp picking element 25 is configured to engage the lower part ($h_1$) of the hemp plant. As a result of the forward movement of vehicle 2 and/or as a result of displacement by means of the transport installation 45 to be described further below the hemp plants are pulled from the ground along with the roots. It is therefore noted that the lower part of a hemp plant is in principle not cut loose from the roots before the hemp plant has been pulled from the ground as a whole.

As shown in FIG. 4, the gripped upper part ($h_2$) of a hemp plant (h) which has been cut loose with mowing element 55 is picked up by the upper hemp picking element 26. This upper part ($h_2$) of the fibre plant comprises a top, flower or plume portion ($h_5$) and a remaining upper portion ($h_3$). As will be elucidated below, in determined embodiments the top portion ($h_5$) of the upper part ($h_2$) of the hemp plant (h) will be removed using a cutting unit. The top portion ($h_5$) is here discharged via discharge means comprising a discharge pipe 28 with an inlet opening close to the cutting unit, a centrifugal fan 20 connected to the discharge pipe and an outlet opening to a receptacle 16 arranged via a frame 17 on the rear side of vehicle 2. As shown in FIG. 4, this receptacle 16 is releasably mounted via rapid couplings 18 on a frame part of frame 6 and will essentially only be used when the intention is to remove the top portions ($h_5$) from a fibre plant. In other words, when the top portion is not cut off, receptacle 16 can optionally be dispensed with.

The lower part ($h_1$) of a hemp plant (h) is similarly composed of a root portion $h_6$ where the roots of the hemp plant are located and a remaining lower part $h_4$. In determined embodiments the root portion $h_6$ will be removed from the lower part $h_1$ of the hemp plants (h) by means of a root cutting unit to be further described below (for instance the root cutting unit of FIG. 14 to be described below). These removed root parts $h_6$ can be discharged to the receptacle 16 on the vehicle, although they are preferably dropped (in a manner which is not further described) directly onto the ground (o). In a determined embodiment the cutting unit and the associated discharge means of the root portions ($h_6$) are embodied such that these portions come to lie directly in front of one or more of the wheels 7, 8. This has the result that when vehicle 2 advances, the cut-off root portions $h_6$ are compressed or even pressed into the ground under the weight of the tyres of wheels 7, 8. In other words, in this embodiment the roots are pressed into the ground and the tops are collected in receptacle 16, which has the result that the delivering units 13 place only the lower remaining parts ($h_4$) and the upper remaining parts ($h_3$) of a hemp plant (h) onto the ground (o) on the rear side of the vehicle. As further elucidated elsewhere, in determined embodiments the two delivering units 13 are configured to place a first row 15*a* of only lower remaining parts ($h_4$) of the hemp plant and a second row 15*b* of only upper remaining parts ($h_3$) of the hemp plants (h) onto the ground and then have them undergo the desired retting process (FIG. 2).

Figure 5:
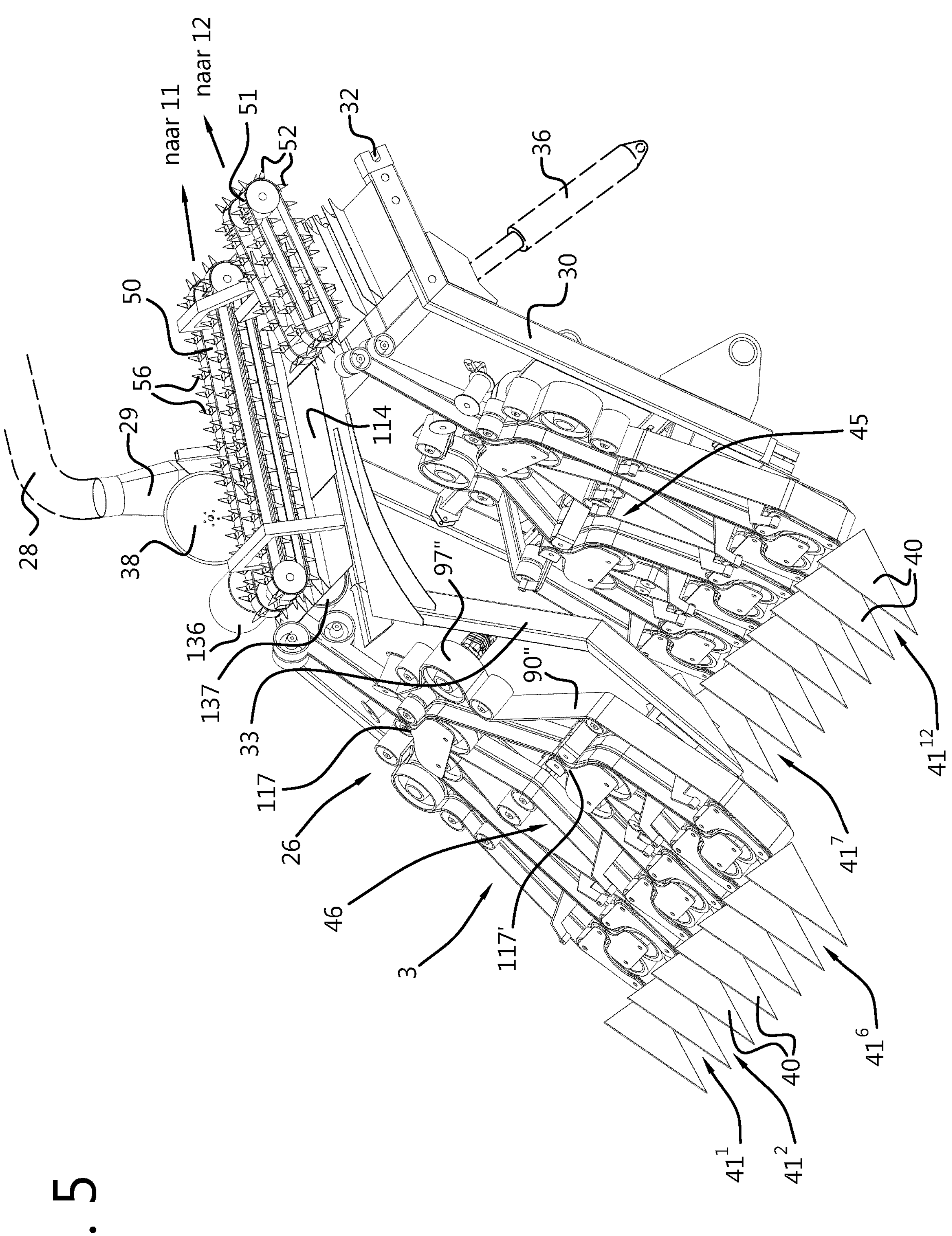
FIG. 5 is a detail view of an embodiment of a processing unit 3 according to the invention.
Figure 7:
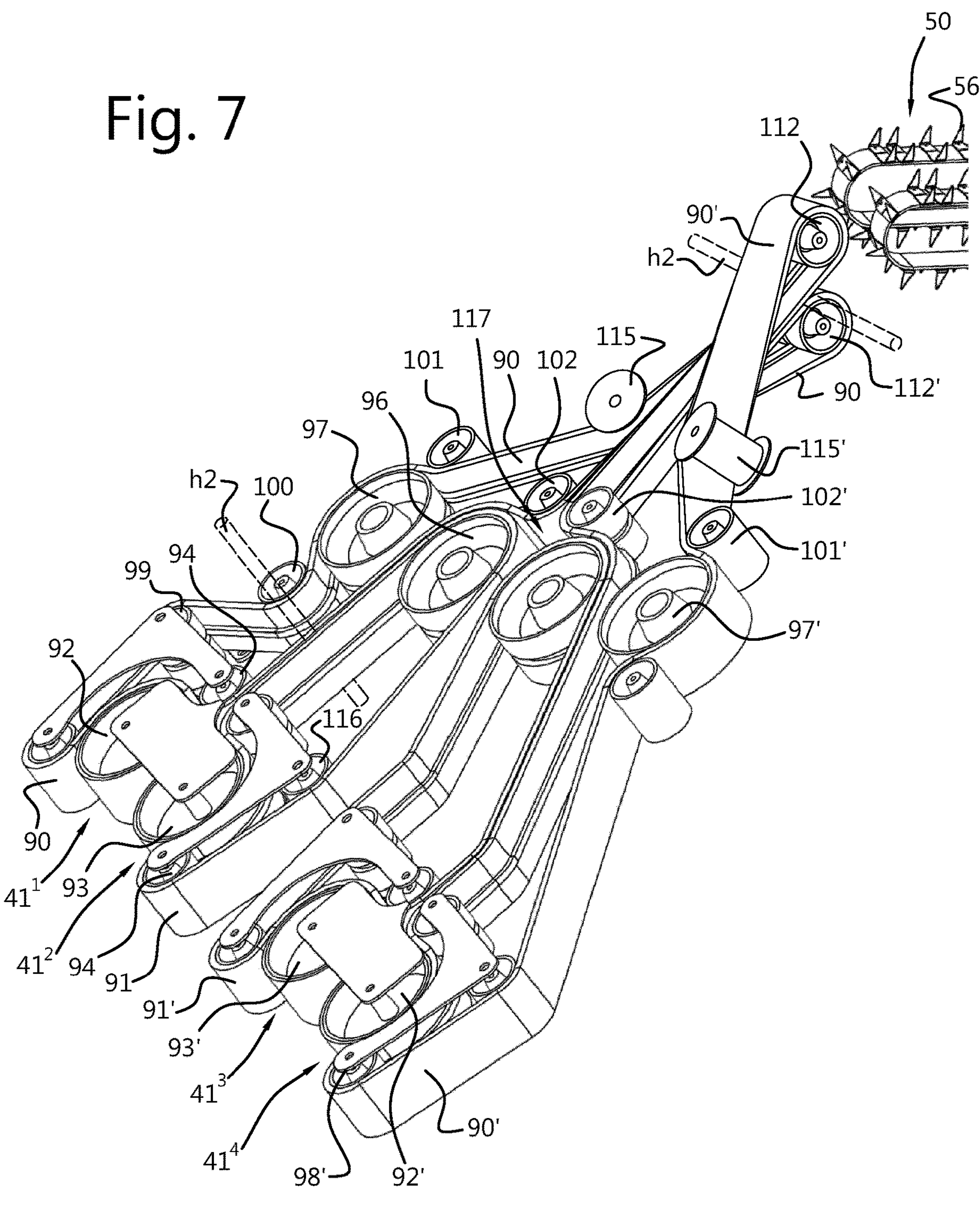
FIG. 7 is a perspective side view of the embodiment of FIG. 6.

FIG. 5 shows a view of hemp picking unit 3, while FIG. 7 shows a part of the upper picking element 26 of hemp picking unit 3 in more detail. Both figures show the transport installations 45, 46 whereby the hemp plants are gripped and transported to vehicle 2. Each of the transport installations 45, 46 comprises a number of endless belt conveyors, more particularly a first number of endless belt conveyors for gripping the crop, transporting it and tilting the crop during transport, and a second number of endless belt conveyors for receiving the crop from the first number of belt conveyors and transporting the crop to the conveyors on vehicle 2. The second number of conveyors (characteristically 3, 4 or more) is here usually smaller than the first number of conveyors (characteristically 1 or 2).

Guide elements 40 are provided on the front side of both the lower hemp picking element 25 and the upper hemp picking element 26. Their object is to make it possible to be able, when the vehicle and the picking unit 3 mounted thereon are advanced, to push the hemp plants (h) to the side and guide them into a number of, in FIG. 5 six per hemp picking unit (although this can also be a greater or smaller number in other embodiments), passages 41$^1$-41$^6$ for the upper hemp picking element 26 and passages 41$^7$-41$^{12}$ for the lower hemp picking element 25, all configured to receive and grip the hemp plants. These twelve passages are formed by a number of driven conveyor belts and a number of pulleys.

Figure 6:
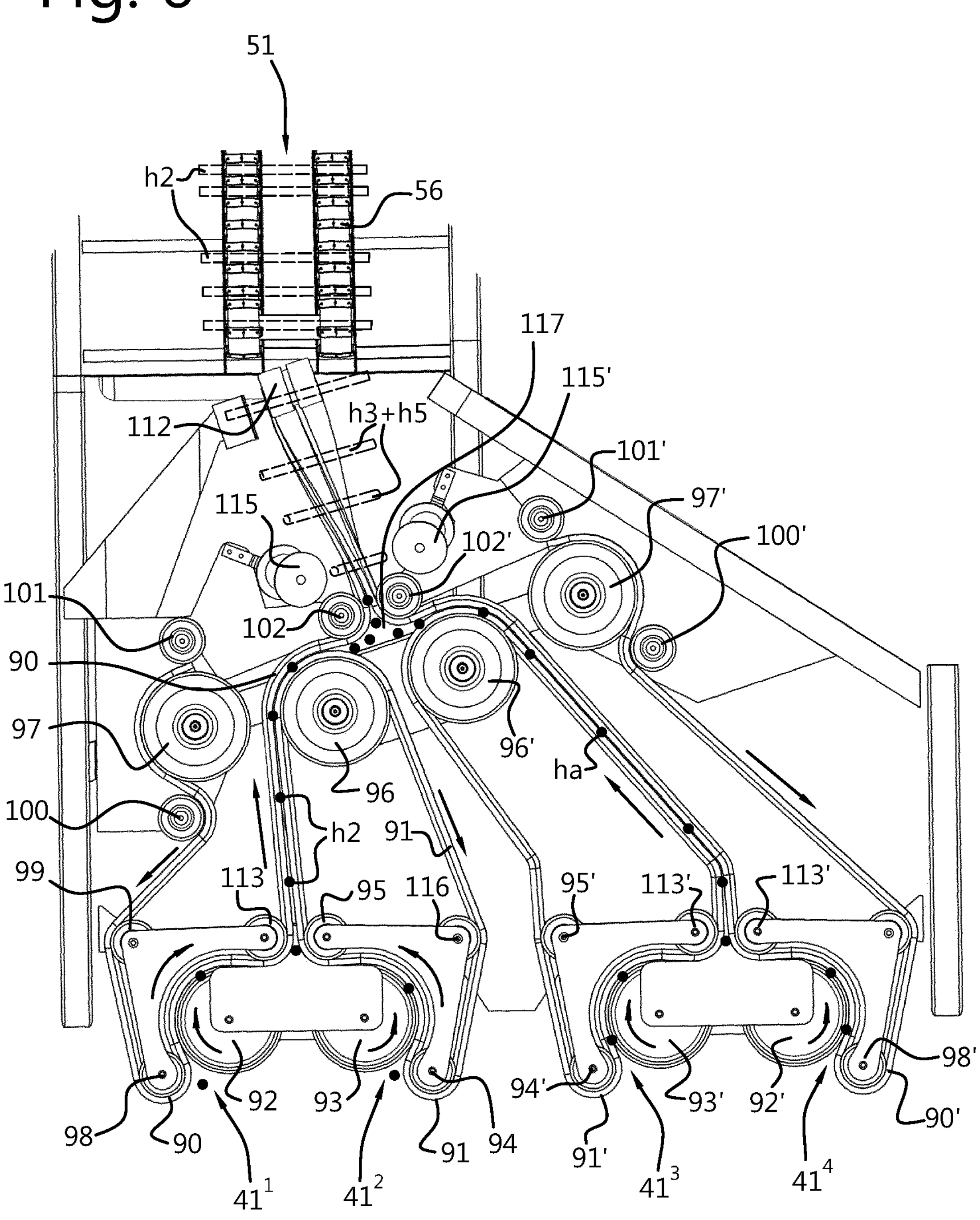
FIG. 6 is a top view of an alternative embodiment of a processing unit according to the invention.

Referring to FIGS. 6 and 7 (showing an alternative embodiment having only two passages. The operation of the embodiment shown for instance in FIG. 5 is substantially the same), a first passage 41$^1$ is shown which is formed by the intermediate space between a first driven conveyor belt 90 and roller 92. A second passage 41$^2$ is formed by a second driven conveyor belt 91 and roller 93. Likewise, the third passage 41$^3$ and fourth passage 41$^4$ are formed by respectively conveyor belt 91' and roller 93', and conveyor belt 90' and roller 92'.

When hemp plants (h, shown in FIG. 6 with black dots in as far as the hemp plants are in upright position and shown with broken lines as soon as the hemp plants have been rotated to the lying position) have found their way into the first passage 41$^1$ formed between the first driven conveyor belt 90 and roller 92, they are pulled along in the direction indicated by the arrow. Along the first section the hemp plants which have found their way into passage 41$^1$ are enclosed between the first conveyor belt and the roller 92 and transported thereby, further on the hemp plants come to lie between first conveyor belt 90 and second conveyor belt 91. The second conveyor belt 91 is a relatively short conveyor belt and extends in upward direction over its whole length. The second conveyor belt 91 is trained around said roller 93, a number of further rollers 94, 95 and 116 and a driven pulley or roller 96. The third conveyor belt 91' of the third passage $41^3$ has essentially the same construction as the second conveyor belt 91, except in mirror image and driven by a drive pulley or drive roller 96'.

The first conveyor belt 90 is a lot longer than the second conveyor belt 91 and extends over a part of its length in upright state, but along a different part of its length the position of the conveyor belt is rotated from the upright position to a lying position, and further along from a lying position back to an upright position. The first conveyor belt 90 is trained around said roller 92 and a number of further rollers 113, 96 (via second conveyor belt 91), 102, 112, 115, 101, 97 (roller 97 is driven), 100, 99 and 98 (as seen in transport direction). The fourth conveyor belt 90' of the fourth passage $41^4$ has essentially the same construction as first conveyor belt 90, except in mirror image and driven by a drive pulley or drive roller 97' and trained over rollers 92', 113', 96' (via third conveyor belt 91'), 102', 112', 115', 101', (driven) 97', 100', 99' and 98'. The driven rollers or pulleys 97, 96, 96' and 97' (and in the embodiment of FIG. 5 the rollers or pulleys of the fifth and sixth conveyor belts 91" and 90" as well) are each driven individually by their own motor, preferably their own hydraulic motor 120.

The figures show embodiments of the transport installations 45, 46 in which different endless belt conveyors are used for temporarily supplying a number of hemp plant streams. Parts of endless belt conveyors are here preferably used in combination in order to thus achieve an efficient use of the space available on the picking elements and/or to limit the complexity and thereby the costs of the transport installations. It is for instance shown in the drawings that a converging area 117 (FIG. 6), wherein two (or more) streams of hemp plants converge, is defined roughly halfway between the entry of the hemp plants on the front side of each of the transport installations 45, 46 and the delivery of the plants on the rear side of transport installations 45, 46 to vehicle 2.

Referring to FIGS. 6 and 7, which show an example of an upper hemp picking element 26, transport installation 45, 46 grip in each case the upper parts ($h_2$) of the hemp plants (h) via each of the passages 41 and process them further. The upper parts ($h_2$) of the hemp plants are pulled inward into said passages. In the drawings a small number of fibre plants (h) is shown with black dots, although in practice this number will of course be much greater and a substantially continuous row of fibre plants will be transported between the endless conveyor belts 90, 91 and 90', 91'. As stated above, the cut-off fibre plants ($h_2$) extend in upward (vertical) direction in the first part of each of the passages, and further along in transport installation 45, 46 the cut-off hemp plants ($h_2$) are rotated through a quarter turn to a lying (substantially horizontal) position (fibre plant parts $h_2$ then being shown in broken lines). Once in this lying position, the fibre plants are transferred from an endless belt conveyor to a further endless belt conveyor (i.e. conveyor 50 of the upper hemp picking element 26 and conveyor 51 of the lower hemp picking element 25).

Figure 8:
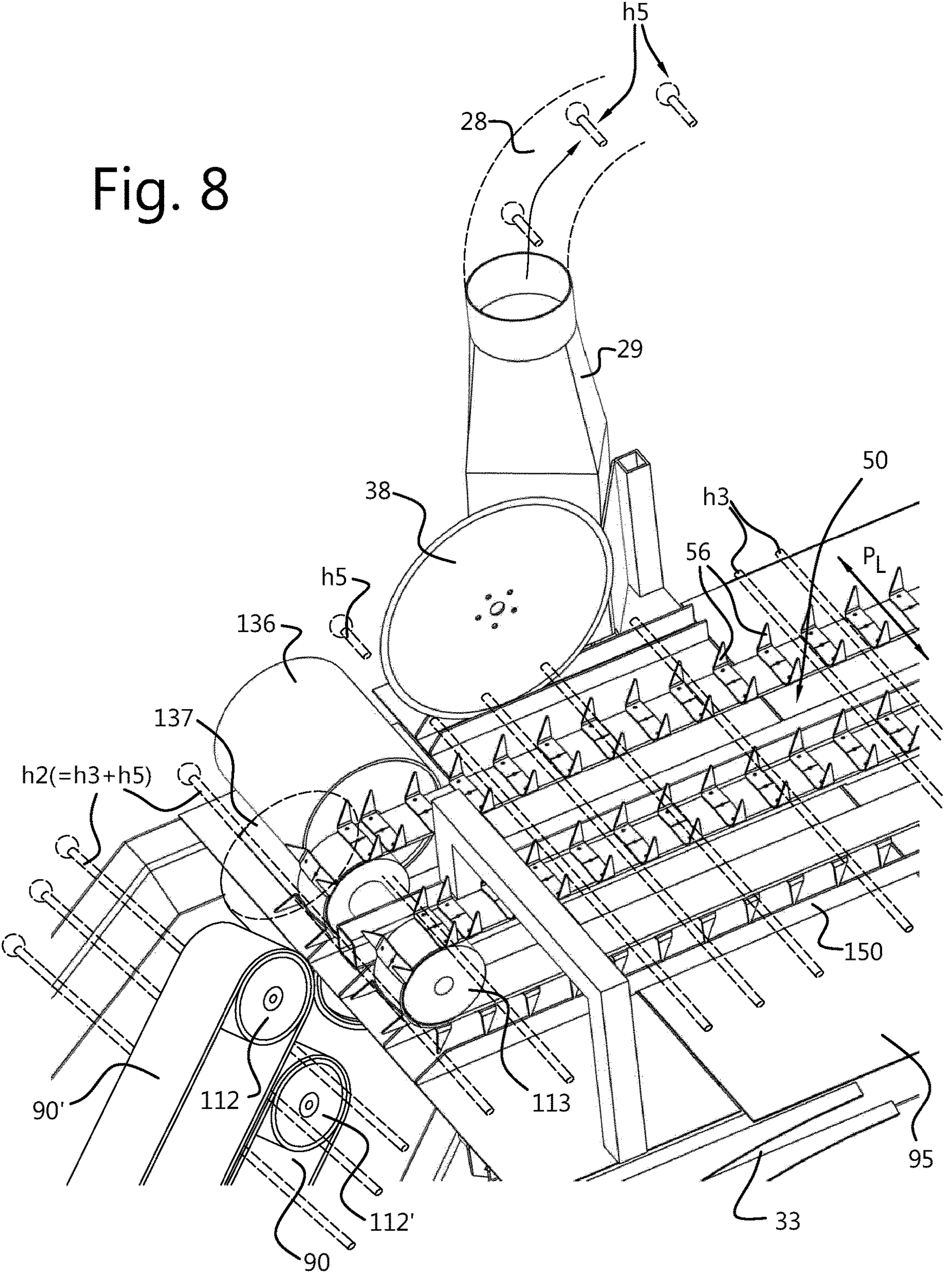
FIG. 8 is a perspective detail view of the embodiment of the processing unit according to FIGS. 5-8.

Referring to FIG. 8, each of the conveyors 50, 51 is constructed in known manner from two mutually adjacent endless conveyor belts which run on rollers in likewise known manner and are advanced via a drive (not shown). The hemp plant parts ($h_2$) are transported further toward vehicle 2 by carriers 56 provided on the endless conveyor belt of conveyor 51, 52 (FIG. 8). Carriers 56 ensure that no hemp plants remain behind and that carried along hemp plants come to lie neatly parallel to each other, perpendicularly of the longitudinal direction (i.e. the axial direction) of machine 1.

FIGS. 5-7 show the operation of transport installation 45 and particularly the turning over of the hemp plants in more detail. The two streams of hemp plants which enter via passages $41^1$ and $41^2$ converge between conveyor belts 90 and 91. The hemp plants ($h_2$) are then transported on between conveyor belts 90, 91 and, after having passed the driven pulley or roller 96, reach said collecting area 117. In the embodiment of FIGS. 6 and 7 the streams from passages $41^1/41^2$ and $41^3/41^4$ converge in this collecting area 117. FIG. 5 shows an embodiment where the combined streams of passages $41^1$ and $41^2$ on one side and the combined streams of a number of other passages on the other converge in collecting area 117. In the embodiment shown in FIG. 6 these are passages $41^3$ and $41^4$, but in the embodiment of FIG. 7 they are the streams from passages $41^3$, $41^4$, $41^5$ and $41^6$ which in turn have already converged previously in a collecting area 117'.

As shown particularly in FIG. 7 (but also in FIGS. 5 and 6), both conveyor belt 90 of the first and second passages $41^1$ and $41^2$ and the conveyor belt 90' of the third and fourth passages $41^3$-$41^4$ (or third to sixth passages in the embodiment of FIG. 5) are tilted after passing both rollers 102, 102' in that the respective belts 90, 90' are guided over rollers 112 having a rotation axis which lies perpendicularly of the rotation axis of rollers 102, 102'.

As shown on the right-hand side of FIG. 7, the hemp plants (i.e. the upper parts $h_2$ cut off by mowing element 55, so consisting of the top parts $h_5$ which have not yet been cut off at that point and the remaining upper parts $h_3$) will be supplied and transported between the conveyor belts in upright position. At a certain point their position changes in that they come to lie between conveyor belts 90 and 90'. At the position of horizontal rollers 112, 112' the hemp plants are released and are received by the further conveyor 50 and transported on. This is shown in more detail in FIG. 8.

The horizontally oriented hemp plant parts ($h_2=h_3+h_5$) reaches the endless belt conveyor 50. The cut-off hemp plants ($h_2$) are enclosed between the underside of the endless belt conveyor 50 and the upper side of a number of upright guide flanges 150 on frame part 33 and transported toward vehicle 2. During this transport the hemp plants ($h_2$) are processed by pressing (rolling) them and by cutting the top portions ($h_5$) off the pressed hemp plants ($h_2$) and discharging them.

The lying hemp plants ($h_2$) are first guided between an upper pressing roller 136 and lower pressing roller 137 so that at least the relevant tops ($h_5$) (these often taking the form of a plume) are pressed. These pressed top portions ($h_5$) of the hemp plants ($h_2$) are then cut off via a top cutting unit 38. This top cutting unit 38 is represented in highly schematic manner in FIG. 8 as a vertically arranged rotatable circular knife. The housing around this circular knife 38, the drive of the rotation of circular knife 38 and guide means for displacing circular knife 38 in lateral direction $P_L$ are not shown. The cut-off top parts ($h_5$) of the hemp parts are extracted via the extraction means 29, for instance a collecting mouth 29, connected to an extraction pipe 28 and a centrifugal fan 20, and blown into the receptacle 16 on the rear side of vehicle 2 for storing the top parts therein.

The picking and further processing of the upper parts ($h_2$) by means of the upper picking unit 26 is described in detail with reference to FIGS. 5-8. The lower parts (h1) of the hemp plants (h) are similarly picked and further processed by the lower hemp picking element 25. A detailed description of the way in which these lower parts ($h_1$) of the hemp plants are gripped and processed can therefore be dispensed with. The lower hemp parts ($h_1$) are gripped and carried along in similar manner by a transport installation 45, rotated through a half turn until they are in horizontal position and then discharged by a conveyor 51.

FIG. 9A otherwise shows a situation in which the lower hemp picking element 25 is in the lowest pivot position. In other words, lifting cylinder 36 is in the wholly retracted state. FIG. 9B, which shows only the lower hemp picking element 25 and wherein the upper hemp picking element 26 is not shown for the sake of convenience, shows a situation in which the lower hemp picking element 25 is pivoted upward to some extent. In other words, lifting cylinder 36 has become longer. In this way the pivot position of the lower hemp picking element 25 can be set as desired, for instance depending on the soil condition (if the soil is level the hemp picking element 25 can be placed closer to the soil/ground than if the soil is uneven). Similarly, the position of the upper hemp picking element 26 can be set as desired with lifting cylinders 42. In the shown embodiment the position of the upper hemp picking element 26 can be set essentially independently of the position of the lower hemp picking element 25. The pivot position of the upper hemp picking element 26, and thereby the height at which the front part of guides 40 and/or the mowing element extend above the ground, can be set depending on the height of the crop to be harvested. In the case of relatively high hemp plants (for instance more than 3 m long) the upper hemp picking element 26 will generally be pivoted further upward, while the hemp picking element 26 is placed further downward in the case of shorter hemp plants (<3 m). It is important here that the crop is cut at a correct height (i.e. height $l_o$ in FIG. 4) in order to realize an upper part ($h_2$) and a lower part ($h_1$) of the crop with different dimensions. It is noted here that the pivot position of the processing unit, more particularly the pivot position of at least one of the upper and lower picking element, can be adjusted continuously (optionally during travel) in order to ensure that, if there are height variations in the fibre plants, these can be followed so that there is essentially no effect on the swathe.

In the above stated embodiments the processing machine 1 is geared toward processing relatively high/long crops, such as hemp. In other embodiments processing machine 1 can be made suitable in very simple manner for processing shorter/less high crops, such as flax. For this purpose hemp picking unit 3 consisting of at least the upper and lower hemp picking elements 25, 26 is replaced with a flax picking element 129 which is embodied specifically to process this lower crop. The height of the crop, such as flax, is usually between 80 cm and 120 cm ($l_{tot}$=80-120 cm).

Figure 10:
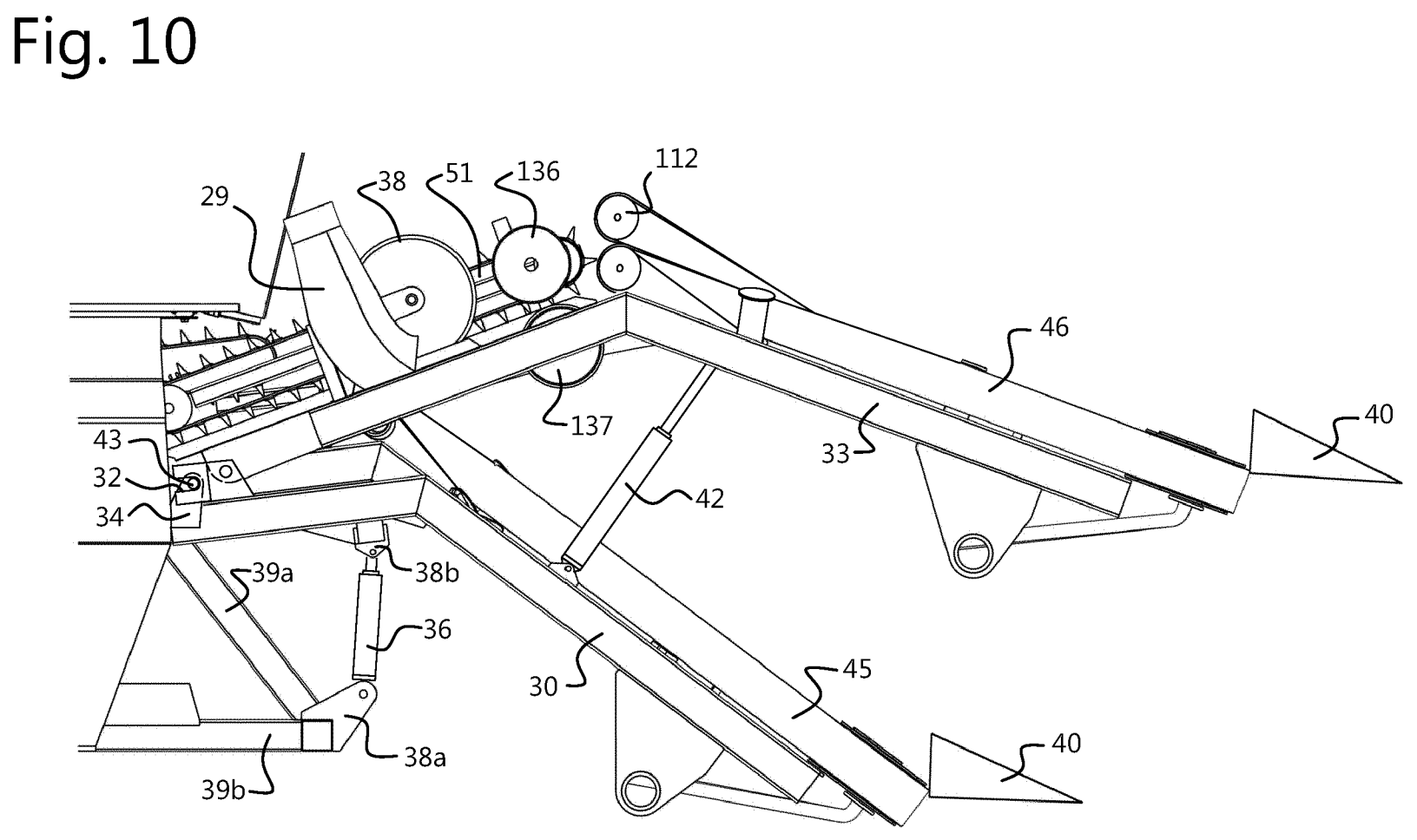
Figure 11:
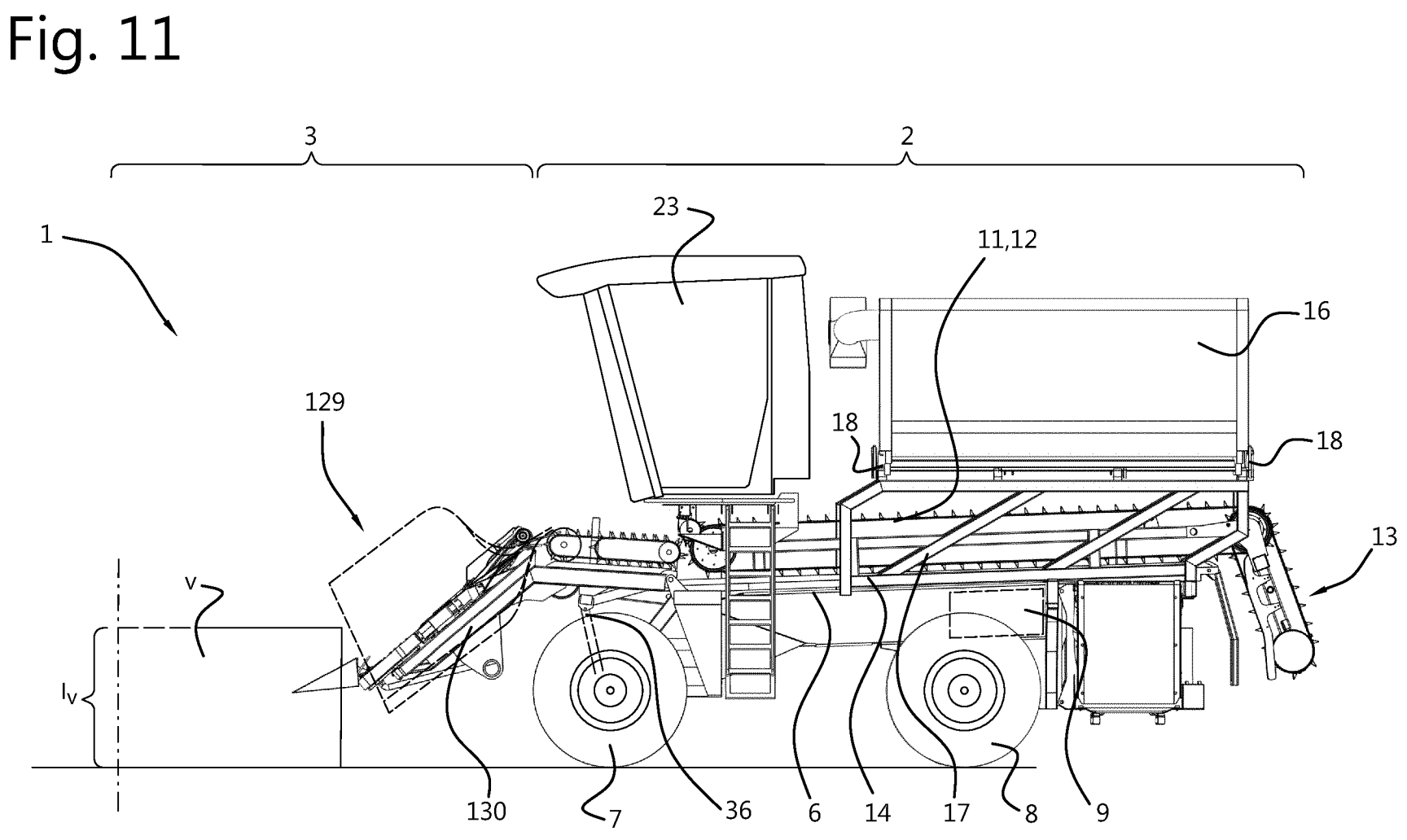
Figure 12:
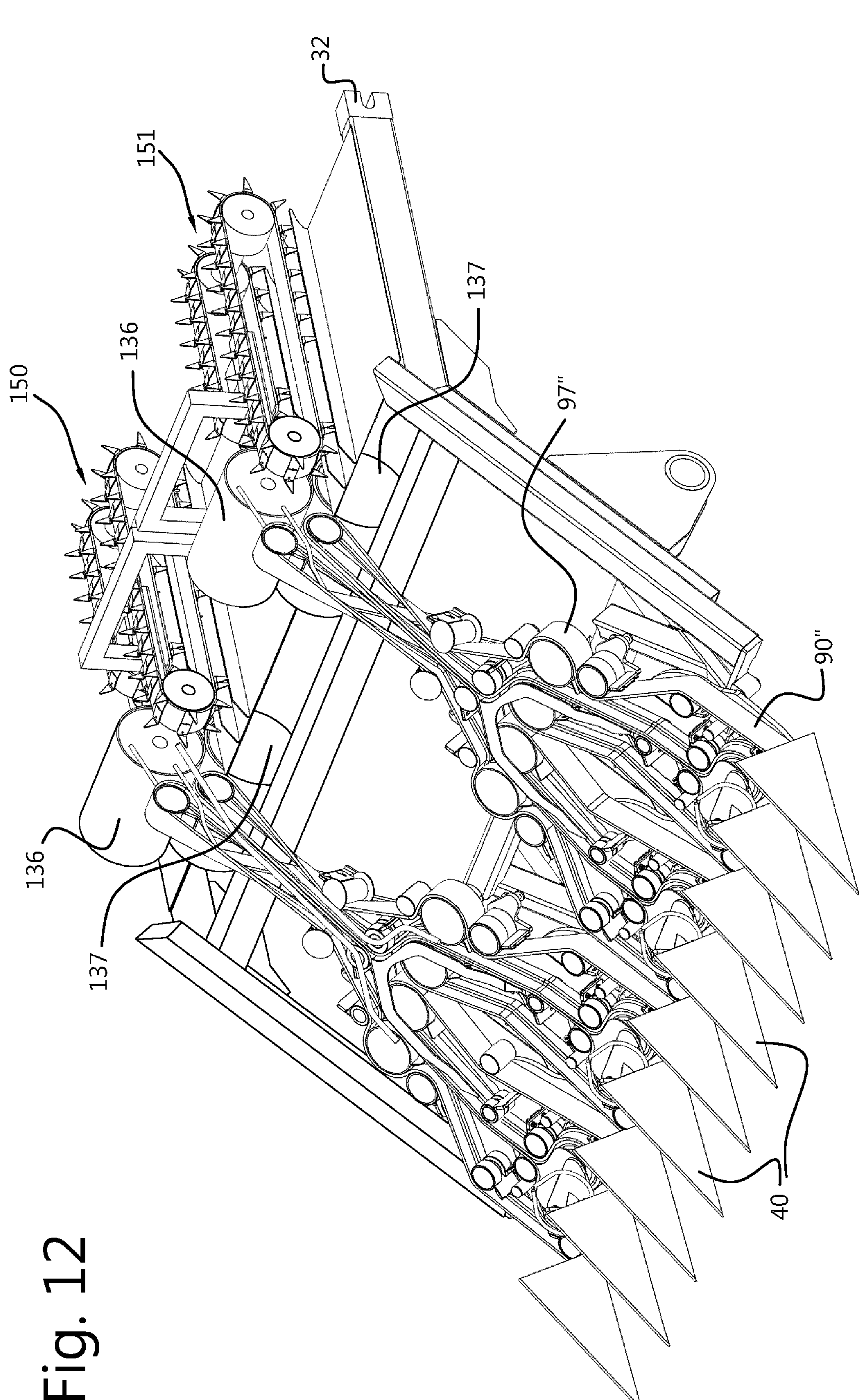
FIG. 12 is a detail view of the embodiment of FIG. 11.

As shown in FIGS. 11 and 12, flax picking element 129 comprises a chassis frame part 130 which is provided with essentially the same mounting means as said lower hemp picking element 25 of the hemp picking unit. Frame part 130 can for instance be mounted on the pivot shaft of the first mounting means 34 of vehicle 2 in simple manner with said mounting means 32. This flax picking unit can be placed on the transverse lifting arm 47*c* of the lifting unit of vehicle 2 in manner similar as the hemp picking unit so that lifting cylinders 36 can pivot frame 130 of the flax picking element in upward and downward direction. The present flax picking unit essentially uses the same techniques to grip this fibre plant, in this case flax, pull it from the ground and transport it toward vehicle 2, and to change the position of the crop during transport toward vehicle 2. Use is for this purpose once again made of a transport installation which is once again constructed from the above-described endless belt conveyors, among other things. A difference with the hemp picking unit is however that the flax picking unit provides the option and space to realize a plurality of passages adjacently of each other. While there are six passages per hemp picking element (so a total of twelve passages, although this number can also be increased or reduced in other embodiments) in the hemp picking unit, there are eight passages in the embodiment of FIGS. 10 and 11, these all being positioned adjacently of each other. The four passages on the left receive flax and this flax is carried via a first conveyor 150 to the first conveyor 11 on vehicle 2, while the four passages on the right are used to carry the remaining flax plants via a second conveyor 151 toward the second conveyor 12 of vehicle 2. The two conveyors 150, 151 are here situated adjacently of each other instead of above each other, as was the case in the hemp picking unit.

FIG. 11 further shows that the flax, at least the upper part thereof, is once again pressed by two pressing rollers 136, 137 in determined embodiments. In determined embodiments the top parts (particularly the bolls, seed capsules) are once again cut off, whereas in other embodiments the cutting off does not take place. These pressing rollers 136, 137 and/or this cutting unit are otherwise also optional, and in determined embodiments they are therefore dispensed with.

FIGS. 4-9B show embodiments of picking units for picking relatively long fibre plants, such as the hemp picking unit, and FIGS. 10-11 show picking units for picking relatively short fibre plants, such as the flax plant picking unit of FIGS. 10 and 11. However, these are merely specific examples of processing units which can be mounted on vehicle 2 and can be removed from vehicle 2 in the above stated simple manner. Another example of such a processing unit is a collecting unit. As already described above, the fibre plants are placed down flat on the ground on the rear side of the vehicle after having been picked and rotated. These fibre plants are then left on the ground for some time so that a retting process takes place. To enable retting to take place properly and uniformly, the fibre plants on the ground surface must however be turned over at regular intervals. This turning over can likewise be performed with the same processing machine 1, wherein a so-called collecting unit is then however arranged as processing unit 3. The previously used picking unit, for instance flax picking unit or hemp picking unit, is exchanged for a collecting unit which is configured to pick up the crop lying flat on the ground, rotate it through 180° and place it back onto the ground in overturned state on the rear side of the vehicle. This turning over of these picked-up fibre plants can once again take place in similar manner using endless conveyor belts between which the fibre plants are gripped. Conveyor belts are here placed such that the fibre plants are rotated through a half turn instead of a quarter turn. The fibre plants reach the vehicle in the overturned (half turn) state and can be transported toward the delivering units in known manner by the vehicle. This application requires in principle no modifications on vehicle 2 either to make it suitable for picking up and turning the fibre plants. This means that the processing machine is not only suitable for picking fibre plants of different lengths (i.e. relatively long fibre plants such as hemp or relatively short fibre plants such as flax), but is also suitable for picking back up, wholly turning over and placing back onto the ground surface fibre plants after they have been picked and placed down on the ground. In other words, the proposed processing machine is not only a picking machine but also a turning machine. It will be apparent that the costs of processing the fibre plants can hereby be limited to considerable extent and an extremely versatile processing machine can be realized.

FIG. 13 shows a further embodiment of a processing unit 113 for picking relatively long fibre plants, such as hemp. Processing unit 113 has a pivotable upper picking element 123 and a pivotable lower picking element 125. The lower picking element 125 comprises a frame 140 and the upper picking element 123 has a frame 148. The frame 140 of the lower picking element 125 has a first frame part 140*a* which can be mounted pivotally on vehicle chassis 6 in the known, above described manner using the third mounting means 32*a*. This first frame part 140*a* can be pivoted in upward and downward direction using the above described lifting unit comprising a number of lifting cylinders 36. Formed integrally on frame part 140*a* is a second frame part 140*b*. Second frame part 140*b* lies here at an angle (characteristically of about 45 degrees) relative to first frame part 140*a*. A third frame part 140*c* is further formed between the first and second frame parts 140*a*, 140*b*. This third frame part 140*c* functions as support for the first and second frame parts and ensures that the two frame parts keep extending at said angle under heavy load as well. Second frame part 140*b* further comprises a number of support flanges 141 on which a number of lifting cylinders 142 are mounted. Lifting cylinders 142 are pivotally coupled with their outer ends via respective hinges 144 and 145 to the second frame part 140*b* of the frame 140 of lower picking element 125 and to the frame 148 of upper picking element 123. By increasing or reducing the length of lifting cylinders 142 (see arrows) the upper picking element 123 can be pivoted respectively upward and downward.

FIG. 13 also shows an embodiment of the above stated root cutting unit 160 and the cutting unit or mowing unit 55 on the front side of the upper picking element 123. The root cutting unit 160 shown in FIG. 13 is shown in more detail in FIG. 14. The root cutting unit 160 is positioned on the underside of lower picking element 125 in order to cut the root portions (h6) off the flax plants (h) pulled from the ground and transported therealong by the endless belt conveyor 90. Root cutting unit 160 comprises two supports 160, 160', mutually connected with a support arm 166, wherein a lying (horizontal) cutting part 164 is arranged between the two supports 160, 160'. Cutting part 164 is provided with two circular knives 168, 168' which can be rotated via respective root cutting unit drive motors 169, 169'. In this embodiment the root portions cut off by the rotating circular knives 168, 168' drop directly downward and end up on the ground. In other embodiments (not shown) a provision is also made to have the cut-off root portions drop to the ground at a specific lateral position, for instance at one or more lateral positions directly in front of at least one of the two front wheels 7. It is further shown that the height of cutting part 164 can be adjusted relative to the rest of the first picking element by controlling an actuator 165, for instance an electric motor or a hydraulic lifting cylinder, which drives the rod system 167 on which the cutting part 164 is mounted. A single actuator can be provided, for instance mounted on support 160 or support 160', although in other embodiments an actuator is provided at both outer ends of cutting part 164. The rods of rod system 167 are mounted rotatably on the support 160, 160', this such that by pushing against or pulling on the upright rod of the rod system the rods are set into rotation and in this way move cutting part 164 respectively upward and downward.

FIG. 13, and in more detail FIG. 15, also show the cutting or mowing unit 55 already described above with reference to FIG. 4. The cutting unit 55 in FIG. 4 was mounted on the underside of the frame 33 of the upper picking element 26, while the cutting unit of FIG. 15 is arranged on the underside of frame part 148 of the upper picking element 123. The embodiment and operation of cutting unit 55 is however the same in both embodiments.

Cutting unit 55 comprises two support cheeks 57, 57' provided on the underside of frame part 148. Respective L-shaped supports 61, 61' are mounted rotatably (via rotation shafts 58) on the two support cheeks 57, 57'. The rotation movement of the two L-shaped supports is realized by an actuator 59, for instance an electric motor 58 mounted on the relevant support cheek 57, 57'. Rotation of the L-shaped supports 61, 61' provides for upward or downward movement of an elongate cutting element. The height of the cutting unit relative to the rest of the picking element and thereby the height of the cutting unit relative to the ground surface can hereby be adjusted as desired.

The actuator is preferably remotely controllable, for instance from the driver's cab 23 (FIG. 4), so that the height of the cutting unit relative to the rest of the picking element can be adjusted remotely, for instance during travel of the vehicle or just before a quantity of fibre plants of a determined length will be picked.

In the shown embodiments the cutting element is constructed from a (horizontal) row of mutually reciprocally displaceable blades 60 in which a large amount of fibre plants can be cut, this row extending over a substantial or substantially whole width of the upper picking element. The reciprocal displacement of the blades of such a cutting unit is driven by a motor 61, for instance an electric motor and a suitable transmission mechanism.

Because the processing machine is in determined embodiments of the invention able to adjust the position/orientation of the processing unit 3 (more particularly adjust the pivot position of the flax picking element of the flax picking unit, the pivot positions of both the upper picking element and the lower picking element of the hemp picking unit, the pivot position of the collecting unit, the height of cutting unit/mowing unit 55, the position (height) of root cutting unit 160 and/or the (lateral) position of top cutting unit 38) and because this position adjustment (in height direction and lateral direction) further preferably takes place during travel and processing of the fibre plants, it is possible to optimally anticipate the local conditions in the field, for instance a varying height of the fibre plants, a varying orientation of the ground surface, and the like. This varying of the height and/or lateral cutting position can be controlled manually via suitable operating elements in driver's cab 23. In further embodiments this is however done by means of an electronic control unit, for instance a computer. This can be connected to one or more sensors, such as a camera, whereby the height (and/or other parameters) of the fibre plants can for instance be measured. The electronic control unit can then (before the fibre plants are processed or during processing thereof, so while travelling) control one or more of the processing unit (i.e. one or more of the flax picking element, upper picking element, lower picking element and collecting unit), the root cutting unit and the top cutting unit on the basis of the measurement signals of the one or more sensors and on the basis of a predetermined control algorithm. The adjusting can take place dynamically, which means that the control is performed continuously or periodically with a short time interval, so as to thus always have the processing machine in an optimal position during travel. An additional advantage is that, even when the height of the fibre plants varies, the control unit controls at least one of the flax picking element, the upper picking element, the lower picking element, the collecting unit, the root cutting unit and/or the top cutting unit such that the swathes on the rear side of the vehicle come to lie neatly aligned behind the vehicle relative to the centre line. More particularly, the control unit can be configured to take the centre lines of the two swathes in the centre with the picking element and to control the cutting units and/or the picking units on the basis thereof.

Further aspects of the present disclosure are defined in the following numbered clauses.

1. Processing machine for processing relatively short fibre plants such as flax and relatively long fibre plants such as hemp, the processing machine comprising:
   - a self-propelling vehicle comprising a vehicle chassis with arranged thereon at least four wheels and a drive motor for driving at least two, preferably all, wheels, wherein the vehicle chassis is provided with:
     - a first conveyor for transporting at least parts of the fibre plants from a first end to an opposite second end, and a second conveyor for transporting at least parts of the fibre plants from the first end to the second end;
     - first and second delivering units provided at or close to the second end for the purpose of delivering and placing on the ground surface the fibre plants coming from respectively the first and second conveyor;
     - wherein the vehicle chassis comprises first mounting means for mounting of, as desired, either a first exchangeable picking unit or a second exchangeable picking unit; and
   - a first exchangeable picking unit configured to pick and further process the relatively short fibre plants, wherein the first picking unit comprises a first picking unit frame and second mounting means for mounting the first picking unit frame releasably on the first mounting means of the vehicle chassis of the self-propelling vehicle;
   - a second exchangeable picking unit configured to pick and further process the relatively long fibre plants, wherein the second picking unit comprises a second picking unit frame and third mounting means for mounting the second picking unit frame releasably on the first mounting means of the vehicle chassis of the self-propelling vehicle;
     - wherein the upper picking element of the second exchangeable picking unit comprises an upper transport installation for gripping and transporting the upper part of the fibre plant to the first conveyor of the vehicle and the lower picking element of the second exchangeable picking unit comprises a lower transport installation for gripping and transporting the upper part of the fibre plant to the second conveyor of the vehicle.

Clause 2. Processing machine according to clause 1, also comprising an exchangeable collecting unit configured to pick up previously picked, processed and delivered fibre plants, wherein the exchangeable collecting unit comprises a collecting unit frame and fourth mounting means for the purpose of mounting the collecting unit frame releasably on the first mounting means of the vehicle chassis of the self-propelling vehicle.

Clause 3. Processing machine according to clause 1 or 2, wherein the second, third and fourth mounting means take substantially the same form.

Clause 4. Processing machine according to any one of the foregoing clauses, wherein the exchangeable picking units, and preferably also the exchangeable collecting unit, are embodied to be carried wholly by the vehicle chassis of the vehicle.

Clause 5. Processing machine according to any one of the foregoing clauses, wherein the first mounting means and at least one of the second, third and fourth mounting means are configured to make the relevant picking unit or pick-up element pivotable relative to the vehicle chassis.

Clause 6. Processing machine according to any one of the foregoing clauses, comprising at least a lifting unit configured to lift or lower respectively the picking unit or collecting unit.

Clause 7. Processing machine according to clause 6, wherein the lifting unit comprises a profile with a receiving space for placing a processing unit on the profile, wherein the lifting unit preferably comprises a locking mechanism.

Clause 8: Processing machine according to any of the foregoing clauses, wherein the second exchangeable picking unit for picking relatively long fibre plants comprises a lower picking element and an upper picking element for picking respectively a lower part of the fibre plants and an upper part of the fibre plant.

Clause 9: Processing machine according to clause 8, comprising a cutting element configured to cut the fibre plants in the lower part and upper part, wherein the cutting element is mounted on the upper picking element.

Clause 10. Processing unit according to clause 9, wherein the cutting unit is arranged via a displaceable support on the upper picking element, wherein the displaceable support preferably comprises a remotely controllable actuator for remotely adjusting the height of the cutting unit relative to the rest of the picking element.

Clause 11. Processing machine according to any of clauses 8-10, wherein the upper picking element is embodied for pivoting relative to the lower picking element.

Clause 12. Processing machine according to clause 11, comprising a further lifting unit for pivoting the upper picking element relative to the first picking element.

Clause 13. Processing machine according to any one of the clauses 8-12, wherein the upper pivotable picking element is arranged pivotally on the lower pivotable picking element.

Clause 14. Processing machine according to any one of clauses 8-13, wherein both the upper and the lower picking element can be coupled to the vehicle chassis via hinges.

Clause 15. Processing machine according to any one of the foregoing clauses, comprising a transport installation for gripping fibre plants and transporting the same to the first and second transporters of the vehicle.

Clause 16: Processing machine according to clause 15, wherein the transport installation is configured for turning the fibre plants during transporting the same.

Clause 17: Processing machine according to clause 16, wherein at least one transport installation of the first and/or second picking unit is configured to turn the fibre plants from a substantially upright position to a substantially lying position and the transport installation of the collecting unit is configured to turn the fibre plants from a substantially lying position to an overturned, substantially lying position.

Clause 18: Processing machine according to any of clauses 15-17, wherein a transport installation is mounted to at least one of the first picking unit, the second picking unit and the collecting unit Clause 19. Processing machine according to any one of clauses 15-18, wherein at least one transport installation comprises at least one pair of endless conveyor belts configured to grip fibre plants therebetween and transport them in gripped state, and wherein the drive of the conveyor belts comprises one or more rollers driven directly via one or more hydraulic motors.

Clause 20: Processing machine according to any one of the clauses 15-19, wherein each of the collecting units, more specifically each of the picking elements of a collecting unit, has its own transport installation.

Clause 21. Processing machine according to clause 20, wherein the transport installation of the first exchangeable picking unit comprises four pairs of endless conveyor belts for gripping and transporting the fibre plants at four laterally mutually adjacent positions, wherein in the second exchangeable picking unit both the transport installation of the upper picking element and the transport installation of the lower picking element comprises two pairs of endless conveyor belts for gripping and transporting fibre plants in each case at two positions for each of the two heights.

Clause 22: Processing machine according to any one of the clauses 15-21, wherein the upper picking element of the second exchangeable picking unit comprises an upper transport installation for gripping and transporting the upper part of the fibre plant to the first conveyor of the vehicle and the lower picking element of the second exchangeable picking unit comprises a lower transport installation for gripping and transporting the upper part of the fibre plant to the second conveyor of the vehicle.

Clause 23. Processing machine according to any one of the foregoing clauses, wherein each of the picking units is provided with one or more pressing rollers for pressing the fibre plants transported therealong.

Clause 24. Processing machine according to any one of the foregoing clauses, wherein at least one of the first picking unit and the second picking unit comprises at least one of a root cutting unit configured to cut a root part off the rest of the fibre plant and a top cutting unit configured to cut the top part off the rest the fibre plant.

Clause 25. Processing machine according to clause 24, wherein at least one of the root cutting unit and top cutting unit is arranged for lateral displacement on the picking unit frame and wherein at least one actuator is provided for setting the lateral cutting position of parts of the fibre plants to be transported to respectively the first and second conveyor on the vehicle by displacing the relevant cutting unit in lateral direction.

Clause 26. Processing machine according to any one of the foregoing clauses, comprising a collecting element for collecting and storing therein cut-off parts of picked fibre plants, particularly root parts and/or top parts of fibre plants such as hemp plants.

Clause 27. Processing machine according to any one of the clauses 24-26, comprising first discharge means for discharging the cut-off top parts from the top cutting unit to a collecting element on the self-propelling vehicle, wherein the first discharge means preferably comprise a discharge conduit and a suction pump, particularly a centrifugal fan, for the purpose of collecting and extracting cut-off top parts.

Clause 28. Processing machine according to at least one of the clauses 24-27, comprising second discharge means for discharging the cut-off root parts from the root cutting unit to the ground surface, wherein the second discharge means are preferably configured for depositing on the ground in front of one or more wheels of the vehicle in axial direction.

Clause 29. Method for processing, as desired, relatively short fibre plants such as flax or relatively long fibre plants such as hemp with a processing machine according to any one of the foregoing clauses, the method comprising of.

mounting, as desired, the first picking unit on the self-propelling vehicle if relatively short fibre plants must be picked or the second picking unit on the self-propelling vehicle if relatively long fibre plants must be picked or, optionally, the collecting unit for picking up fibre plants already delivered to the ground surface;

driving the processing machine over the ground surface and, using the processing installation, respectively picking the relatively short fibre plants, picking the relatively long fibre plants or picking up fibre plants lying on the ground, and then processing the fibre plants and thereafter placing the processed fibre plants back onto the ground.

Clause 30. Method according to clause 29, comprising of, when the first picking unit for picking relatively short fibre plants is mounted on the vehicle, driving the vehicle over the ground surface and, while travelling over the ground:

gripping fibre plants with the picking element;

pulling the fibre plants including root parts from the ground;

transporting the fibre plants which have been pulled loose with at least one conveyor of the vehicle;

placing the transported fibre plants on the ground surface in at least one of a first and second row with at least one delivering unit.

Clause 31. Method according to clause 30, comprising of, when the second picking unit is mounted on the vehicle, driving the vehicle over the ground surface and, while travelling over the ground:

gripping upper parts of the fibre plants with the second picking element;

cutting the gripped upper parts of the fibre plants loose with the cutting unit;

transporting the upper parts of the fibre plants which have been cut loose to the first conveyor of the vehicle;

gripping lower parts of the fibre plants with the first picking element;

transporting the gripped lower parts of the fibre plants to the second conveyor of the vehicle;

transporting the upper and lower parts of the fibre plants on respectively the first and second conveyor;

placing the upper parts of the fibre plants on the ground in a first row with the first delivering unit; and placing the lower parts of the fibre plants on the ground in a second row, parallel to the first row, with the second delivering unit.

Clause 32. Method according to clause 31, comprising of pivoting the first picking element and/or the second picking element relative to the vehicle, preferably also of pivoting the cutting unit relative to the second picking element, for the purpose of setting the length (lo) of the lower parts and the length (lb) of the upper parts of the fibre plants.

Clause 33. Method according to clause 31 or 32, comprising of pulling the lower parts including root parts loose from the ground after the lower parts of the fibre plants have been gripped, wherein transporting of the gripped lower parts comprises of transporting the lower parts of the fibre plants which were gripped and then pulled loose.

Clause 34. Method according to any one of the clauses 29-33, comprising of cutting the top parts off the upper parts which were cut loose and/or cutting the root parts off lower parts of the fibre plants.

Clause 35. Method according to any one of the clauses 29-34, comprising of pressing the lower parts and/or upper parts of the fibre plants.

The present invention is not limited to the embodiments described herein. The rights sought are defined by the following clauses, within the scope of which numerous modifications can be envisaged.

The invention claimed is:

1. A processing machine for selectively processing short fiber plants and long fiber plants longer than the short fiber plants, the processing machine comprising:

a self-propelling vehicle comprising a vehicle chassis with a plurality of wheels and a drive motor configured to drive at least two of the wheels disposed on the vehicle chassis, the vehicle chassis being provided with:

a first conveyor configured to transport at least parts of the fiber plants from a first end to an opposite second end, and a second conveyor configured to transport at least parts of the fiber plants from the first end to the second end, and first and second delivering systems provided at or close to the second end to deliver and place on the ground surface the fiber plants coming respectively from the first and second conveyors, the vehicle chassis comprising a first mounting system configured to selectively mount one of a exchangeable picking system and a second exchangeable picking system;

the first exchangeable picking system configured to pick and further process the short fiber plants, the first exchangeable picking system comprising a first picker frame and a second mounting system configured to mount the first picker frame releasably on the first mounting system of the vehicle chassis of the self-propelling vehicle; and the second exchangeable picking system configured to pick and further process the long fiber plants, the second exchangeable picking system comprising:

a second picker frame, a third mounting system configured to mount the second picker frame releasably on the first mounting system of the vehicle chassis of the self-propelling vehicle, a lower picker to pick a lower part of the fiber plants, the lower picker comprising a lower transport installation configured to grip and transport the lower part of the fiber plants to the second conveyor of the vehicle, an upper picker to pick upper parts of the fiber plants, the upper picker comprising an upper transport installation configured to grip and transport the upper part of the fiber plants to the first conveyor of the vehicle, and a cutter configured to cut the fiber plants in the lower part and the upper part.

2. The processing machine according to claim 1, further comprising an exchangeable collector configured to pick up previously picked, processed and delivered fiber plants, the exchangeable collector comprising a collector frame, and a fourth mounting system to mount the collector frame releasably on the first mounting system of the vehicle chassis of the self-propelling vehicle.

3. The processing machine according to claim 2, wherein the second, third, and fourth mounting systems take substantially the same form.

4. The processing machine according to claim 2, wherein the first and second exchangeable picking systems, and the exchangeable collector, are embodied to be carried wholly by the vehicle chassis of the vehicle.

5. The processing machine according to claim 2, wherein the first mounting system and at least one of the second, third, and fourth mounting systems are configured to make one or more of the respective exchangeable picking systems, the lower picker, and the upper picker pivotable relative to the vehicle chassis.

6. The processing machine according to claim 2, wherein one of:

(i) both the upper and the lower pickers are coupled to the vehicle chassis via hinges, (ii) the first exchangeable picking system has its own transport installation, and (iii) the exchangeable collector has its own transport installation.

7. The processing machine according to claim 6, wherein at least one of the upper and lower transport installations is configured to one or more of: (i) rotate the fiber plants during transport and (ii) turn the fiber plants from a substantially upright position to a substantially lying position, and the transport installation of the exchangeable collector is configured to turn the fiber plants from a substantially lying position to an overturned, substantially lying position.

8. The processing machine according to claim 1, wherein the cutter is one of: (i) mounted on the upper picker, and (ii) disposed via a displaceable support on the upper picker to remotely adjust the height of the cutter relative to the rest of the upper picker.

9. The processing machine according to claim 1, wherein one of: (i) the upper picker is configured to pivot relative to the lower picker, and (ii) the upper picker is configured to be pivoted relative to the lower picker by a lifting system.

10. The processing machine according to claim 1, wherein the upper picker is configured pivotally on the lower picker.

11. The processing machine according to claim 1, wherein at least one of the upper and lower transport installations comprises at least one pair of endless conveyor belts configured to grip the fiber plants therebetween and transport the fiber plants in a gripped state, the conveyor belts comprising a drive comprising one or more rollers driven directly via one or more hydraulic motors.

12. The processing machine according to claim 1, wherein each of the first and second exchangeable picking systems is provided with one or more pressing rollers configured to press the fiber plants transported therealong.

13. The processing machine according to claim 1, wherein at least one of the first exchangeable picking system and the second exchangeable picking system comprises at least one of a root cutter configured to cut a root part off the rest of the respective fiber plant and a top cutter configured to cut the top part off the rest the fiber plant.

14. A method for selectively processing the short fiber plants or the long fiber plants longer than the short fiber plants, the processing machine according to claim 1, the method comprising:

selectively mounting one of the first exchangeable picking system on the self-propelling vehicle in a case in which the short fiber plants are to be picked and the second exchangeable picking system on the self-propelling vehicle in a case in which the long fiber plants are to be picked; and driving the processing machine over the ground surface, and, using the processing machine, respectively picking one of the short fiber plants, the long fiber plants and the fiber plants lying on the ground, and then processing the fiber plants and thereafter placing the processed fiber plants back onto the ground.

15. The method according to claim 14, further comprising:

when the first exchangeable picking system is mounted on the vehicle, driving the vehicle over the ground surface, and, while travelling over the ground surface:

gripping the fiber plants with the first exchangeable picking system, pulling the fiber plants including root parts from the ground surface, transporting the pulled loose fiber plants with one of the first conveyor and the second conveyor of the vehicle, and placing the transported fiber plants on the ground surface in at least one of a first row and a second row with at least one delivering system, and when the second exchangeable picking system is mounted on the vehicle, driving the vehicle over the ground surface, and, while travelling over the ground:

gripping upper parts of the fiber plants with the upper picker of the second exchangeable picking system, cutting the gripped upper parts of the fiber plants loose with the cutter, transporting the cut loose upper parts of the fiber plants to the first conveyor, gripping lower parts of the fiber plants with the lower picker of the second exchangeable picking system, transporting the gripped lower parts of the fiber plants to the second conveyor, transporting the upper and lower parts of the fiber plants on respectively the first and second conveyors, placing the upper parts of the fiber plants on the ground in a first row with the delivering system, and placing the lower parts of the fiber plants on the ground in a second row, parallel to the first row, with the second delivering system.

16. The method according to claim 15, further comprising one or more of: (i) cutting top parts off the cut loose upper parts with a top cutter, (ii) cutting root parts off the lower parts of the fiber plants with a root cutter, (iii) pressing the lower parts of the fiber plants with one or more pressing rollers, and (iv) pressing the upper parts of the fiber plants with the one or more pressing rollers.

17. A processing machine for selectively processing short fiber plants and long fiber plants longer than the short fiber plants, the processing machine comprising:

a self-propelling vehicle comprising a vehicle chassis with a plurality of wheels and a drive motor configured to drive at least two of the wheels disposed on the vehicle chassis, the vehicle chassis being provided with:

a first conveyor configured to transport at least parts of the fiber plants from a first end to an opposite second end, and a second conveyor configured to transport at least parts of the fiber plants from the first end to the second end, and first and second delivering systems provided at or close to the second end to deliver and place on the ground surface the fiber plants coming respectively from the first and second conveyors, the vehicle chassis comprising a first mounting system configured to selectively mount one of a first exchangeable picking system and a second exchangeable picking system;

the first exchangeable picking system configured to pick and further process the short fiber plants, the first exchangeable picking system comprising a first picker frame and a second mounting system configured to mount the first picker frame releasably on the first mounting system of the vehicle chassis of the self-propelling vehicle;

the second exchangeable picking system configured to pick and further process the long fiber plants, the second exchangeable picking system comprising:

a second picker frame, a third mounting system configured to mount the second picker frame releasably on the first mounting system of the vehicle chassis of the self-propelling vehicle; and a lifting system configured to lift one of the exchangeable picking systems or lower a collector, the lifting system comprising a profile with a receiving space to receive a processor on the profile, and a locking mechanism.

18. A processing machine for selectively processing short fiber plants and long fiber plants longer than the short fiber plants, the processing machine comprising:

a self-propelling vehicle comprising a vehicle chassis with a plurality of wheels and a drive motor configured to drive at least two of the wheels disposed on the vehicle chassis, the vehicle chassis being provided with:

a first conveyor configured to transport at least parts of the fiber plants from a first end to an opposite second end, and a second conveyor configured to transport at least parts of the fiber plants from the first end to the second end, and first and second delivering systems provided at or close to the second end to deliver and place on the ground surface the fiber plants coming respectively from the first and second conveyors, the vehicle chassis comprising a first mounting system configured to selectively mount one of a first exchangeable picking system and a second exchangeable picking system;

the first exchangeable picking system configured to pick and further process the short fiber plants, the first exchangeable picking system comprising a first picker frame and a second mounting system configured to mount the first picker frame releasably on the first mounting system of the vehicle chassis of the self-propelling vehicle; and the second exchangeable picking system configured to pick and further process the long fiber plants, the second exchangeable picking system comprising:

a second picker frame, a third mounting system configured to mount the second picker frame releasably on the first mounting system of the vehicle chassis of the self-propelling vehicle, a lower transport installation, and an upper transport installation, wherein the first exchangeable picking system comprises at least one transport installation comprising four pairs of endless conveyor belts configured to grip and transport the fiber plants at four laterally mutually adjacent positions, and wherein, in the second exchangeable picking system, both the upper transport installation and the lower transport installation comprise two pairs of endless conveyor belts configured to grip and transport the fiber plants in each case at two positions for each of two heights.

19. A processing machine for selectively processing short fiber plants and long fiber plants longer than the short fiber plants, the processing machine comprising:

a self-propelling vehicle comprising a vehicle chassis with a plurality of wheels and a drive motor configured to drive at least of the two wheels disposed on the vehicle chassis, the vehicle chassis being provided with:

a first conveyor configured to transport at least parts of the fiber plants from a first end to an opposite second end, and a second conveyor configured to transport at least parts of the fiber plants from the first end to the second end, and first and second delivering systems provided at or close to the second end to deliver and place on the ground surface the fiber plants coming respectively from the first and second conveyors, the vehicle chassis comprising a first mounting system configured to selectively mount one of a first exchangeable picking system and a second exchangeable picking system;

the first exchangeable picking system configured to pick and further process the short fiber plants, the first exchangeable picking system comprising a first picker frame and a second mounting system configured to mount the first picker frame releasably on the first mounting system of the vehicle chassis of the self-propelling vehicle;

the second exchangeable picking system configured to pick and further process the long fiber plants, the second exchangeable picking system comprising:

a second picker frame, and a third mounting system configured to mount the second picker frame releasably on the first mounting system of the vehicle chassis of the self-propelling vehicle; and a collector configured to collect and store therein cut-off parts of picked fiber plants including one or more of root parts and top parts of the fiber plants.

20. A processing machine for selectively processing short fiber plants and long fiber plants longer than the short fiber plants, the processing machine comprising:

a self-propelling vehicle comprising a vehicle chassis with a plurality of wheels and a drive motor configured to drive at least of the two wheels disposed on the vehicle chassis, the vehicle chassis being provided with:

a first conveyor configured to transport at least parts of the fiber plants from a first end to an opposite second end, and a second conveyor configured to transport at least parts of the fiber plants from the first end to the second end, and first and second delivering systems provided at or close to the second end to deliver and place on the ground surface the fiber plants coming respectively from the first and second conveyors, the vehicle chassis comprising a first mounting system configured to selectively mount one of a first exchangeable picking a second exchangeable picking system;

the first exchangeable picking system configured to pick and further process the relatively short fiber plants, the first exchangeable picking system comprising a first picker frame and a second mounting system configured to mount the first picker frame releasably on the first mounting system of the vehicle chassis of the self-propelling vehicle;

the second exchangeable picking system configured to pick and further process the relatively long fiber plants, the second exchangeable picking system comprising:

a second picker frame, and a third mounting system configured to mount the second picker frame releasably on the first mounting system of the vehicle chassis of the self-propelling vehicle; and a discharge system configured to discharge cut-off top parts from a top cutter to a collector on the self-propelling vehicle, the discharge system comprising a discharge conduit and a suction pump to collect and extract the cut-off top parts.

21. A processing machine for selectively processing short fiber plants and long fiber plants longer than the short fiber plants, the processing machine comprising:

a self-propelling vehicle comprising a vehicle chassis with a plurality of wheels and a drive motor configured to drive at least of the two wheels disposed on the vehicle chassis, the vehicle chassis being provided with:

a first conveyor configured to transport at least parts of the fiber plants from a first end to an opposite second end, and a second conveyor configured to transport at least parts of the fiber plants from the first end to the second end, and first and second delivering systems provided at or close to the second end to deliver and place on the ground surface the fiber plants coming respectively from the first and second conveyors, the vehicle chassis comprising a first mounting system configured to selectively mount one of a first exchangeable picking system and a second exchangeable picking system;

the first exchangeable picking system configured to pick and further process the short fiber plants, the first exchangeable picking system comprising a first picker frame and a second mounting system configured to mount the first picker frame releasably on the first mounting system of the vehicle chassis of the self-propelling vehicle;

the second exchangeable picking system configured to pick and further process the long fiber plants, the second exchangeable picking system comprising:

a second picker frame, and a third mounting system configured to mount the second picker frame releasably on the first mounting system of the vehicle chassis of the self-propelling vehicle; and a discharge system configured to discharge cut-off root parts from a root cutter to the ground surface, the discharge system being configured to deposit the cut-off root parts on the ground in front of one or more of the wheels of the vehicle in an axial direction.

* * * * *